United States Patent [19]

Spence et al.

[11] Patent Number: 4,947,321

[45] Date of Patent: Aug. 7, 1990

[54] MICR REJECTS ANALYSIS AND MANAGEMENT INFORMATION SYSTEM

[75] Inventors: James S. Spence, Atlanta; Harry W. Grow, Dunwoody, both of Ga.

[73] Assignee: Stanford Technologies, Inc., Atlanta, Ga.

[21] Appl. No.: 443,865

[22] Filed: Nov. 30, 1989

Related U.S. Application Data

[63] Continuation of Ser. No. 177,298, Apr. 4, 1988, abandoned.

[51] Int. Cl.$^5$ .............................................. G06F 15/30
[52] U.S. Cl. .................................... 364/401; 235/379; 382/57
[58] Field of Search ............... 364/401, 402, 406, 408; 235/379, 449; 382/57

[56] References Cited

U.S. PATENT DOCUMENTS

| | | | |
|---|---|---|---|
| 3,988,571 | 10/1976 | Blair et al. ........................ | 101/2 X |
| 4,205,780 | 6/1980 | Burns et al. ...................... | 235/454 |
| 4,250,806 | 2/1981 | Boyson et al. .................... | 101/2 |
| 4,264,808 | 4/1981 | Owens et al. .................... | 235/375 X |
| 4,315,246 | 2/1982 | Milford ............................ | 235/454 X |
| 4,564,752 | 1/1986 | Lepic et al. ...................... | 235/437 |

OTHER PUBLICATIONS

"UMARS Software-Utilization Management and Reporting System", Dataserve, A Bell South Company, Edon Prairie, MN.

*Primary Examiner*—Jerry Smith
*Assistant Examiner*—Steven Kibby
*Attorney, Agent, or Firm*—Nixon & Vanderhye

[57] ABSTRACT

An interactive and menu driven microcomputer-based system is disclosed which provides financial institution management and quality control personnel with a powerful tool to help manage and control MICR encoded document rejects to reduce the rate of such rejects to a minimum. The reject analysis system's dedicated microcomputer is linked to a bank's mainframe computer either directly or indirectly by utilizing a mainframe generated item processing magnetic tape file. The microcomputer-based system may, for example, include a PC having a keyboard and a CRT display, a tape drive, a hard disk, an extended RAM memory, and a printer for generating advisory letters and other hard copy documents. The microcomputer-based system also includes a MICR reader and analyzer which permits rejected checks to be analyzed for their MICR quality. The system displays a daily summary report showing the total document items processed, the number of rejected items, as well as the rejected percentage. The summary display generically identifies rejected item sources and pinpoints those areas which require immediate attention. The system also interactively generates a series of display screens including a preprinted rejects report that identifies by account number, the accounts generating the highest number of rejected checks. In this fashion, the bank is able to quickly isolate those accounts having the most significant impact on its rejected items related operating expense.

48 Claims, 20 Drawing Sheets

STARTUP

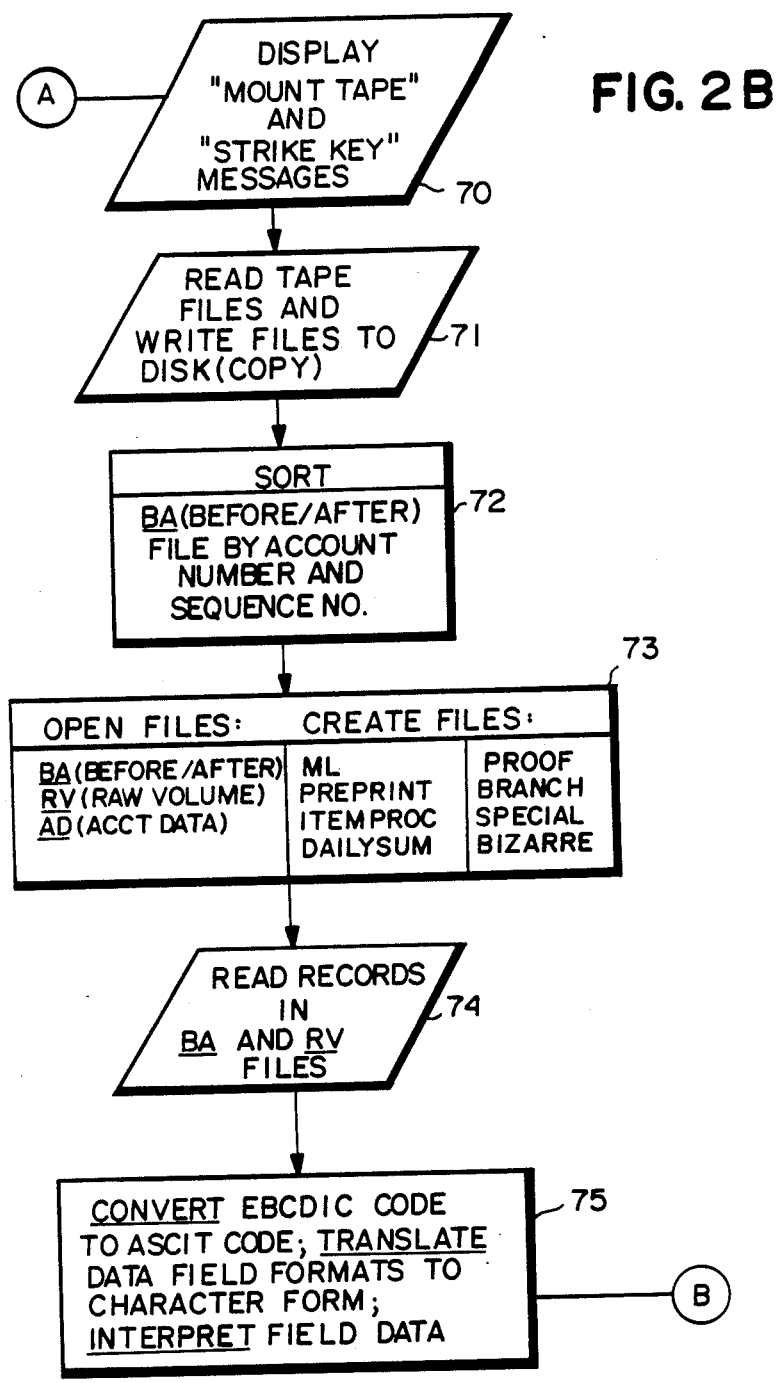

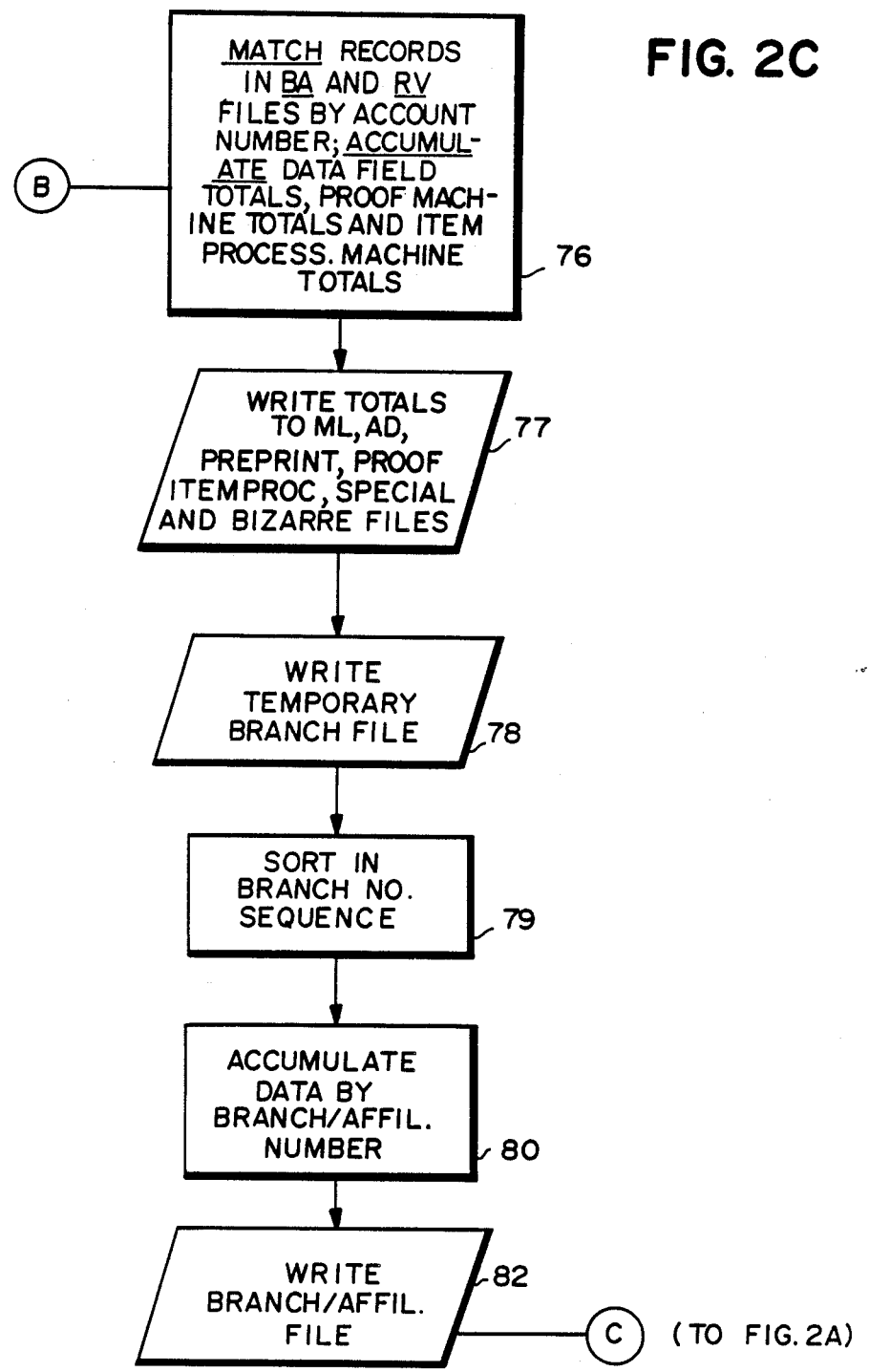

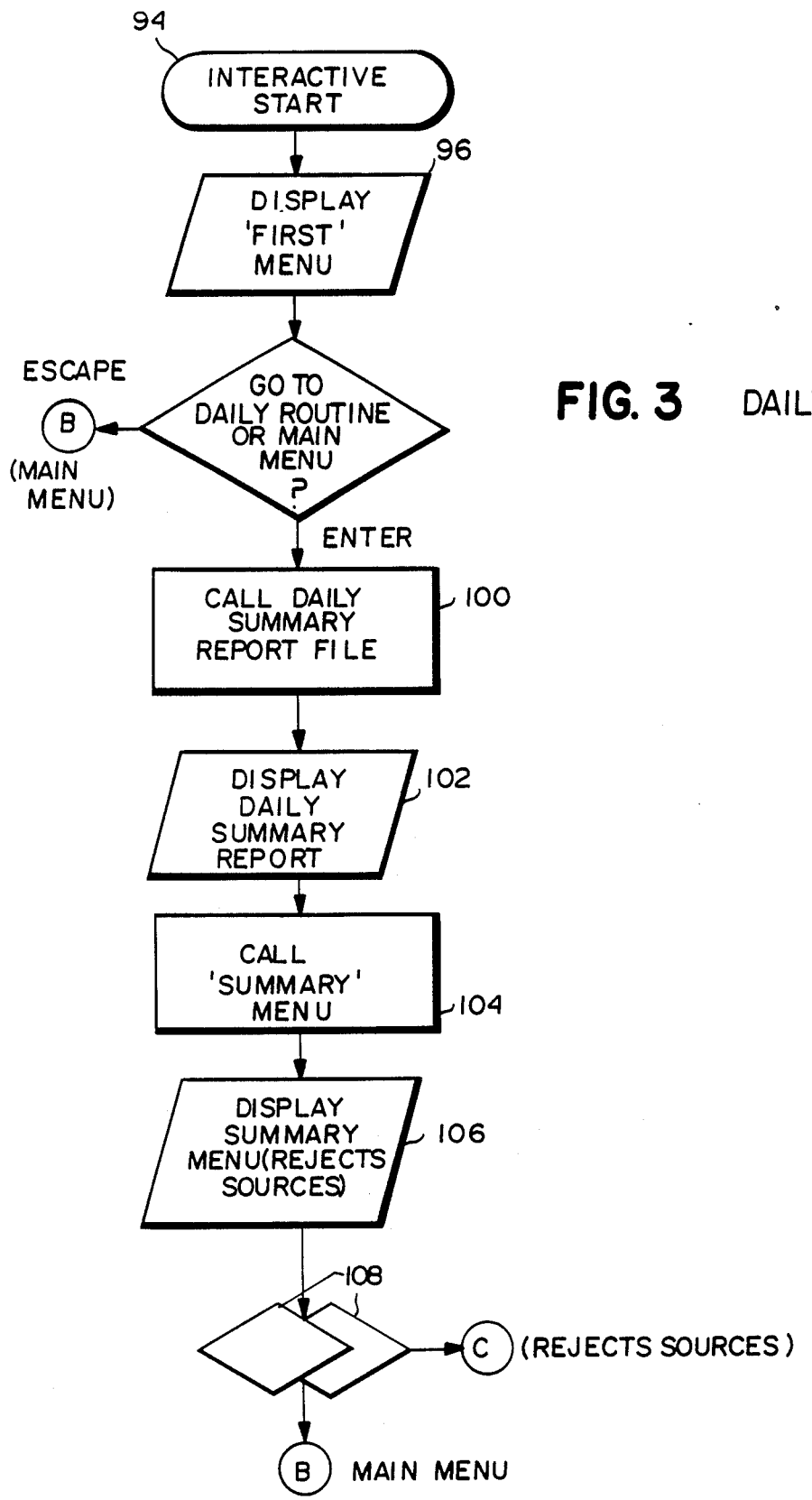
FIG. 3 DAILY ROUTINE

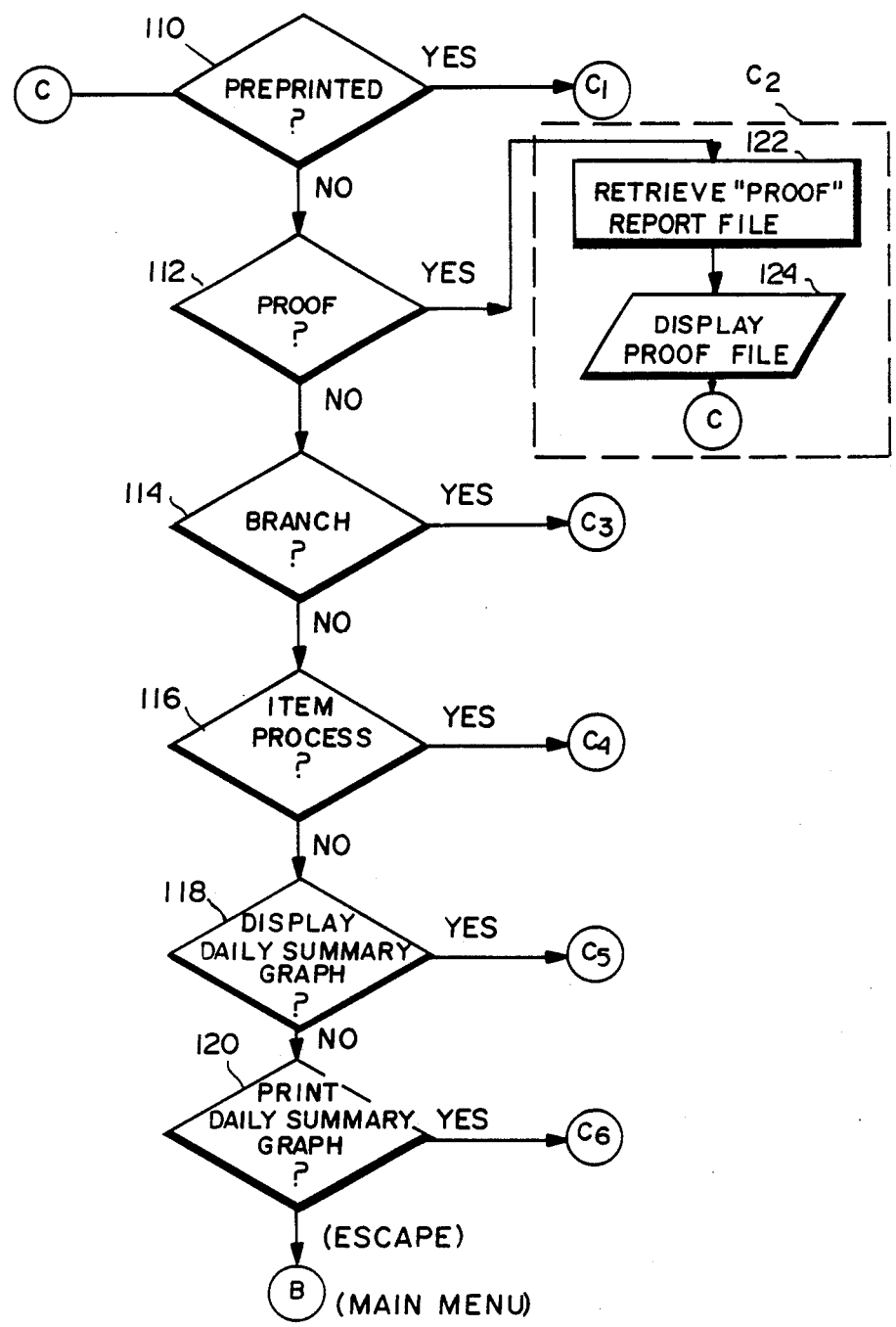
FIG. 4 REJECTS SOURCES DAILY ROUTINE

FIG. 5 PREPRINTED FLOW DAILY ROUTINE
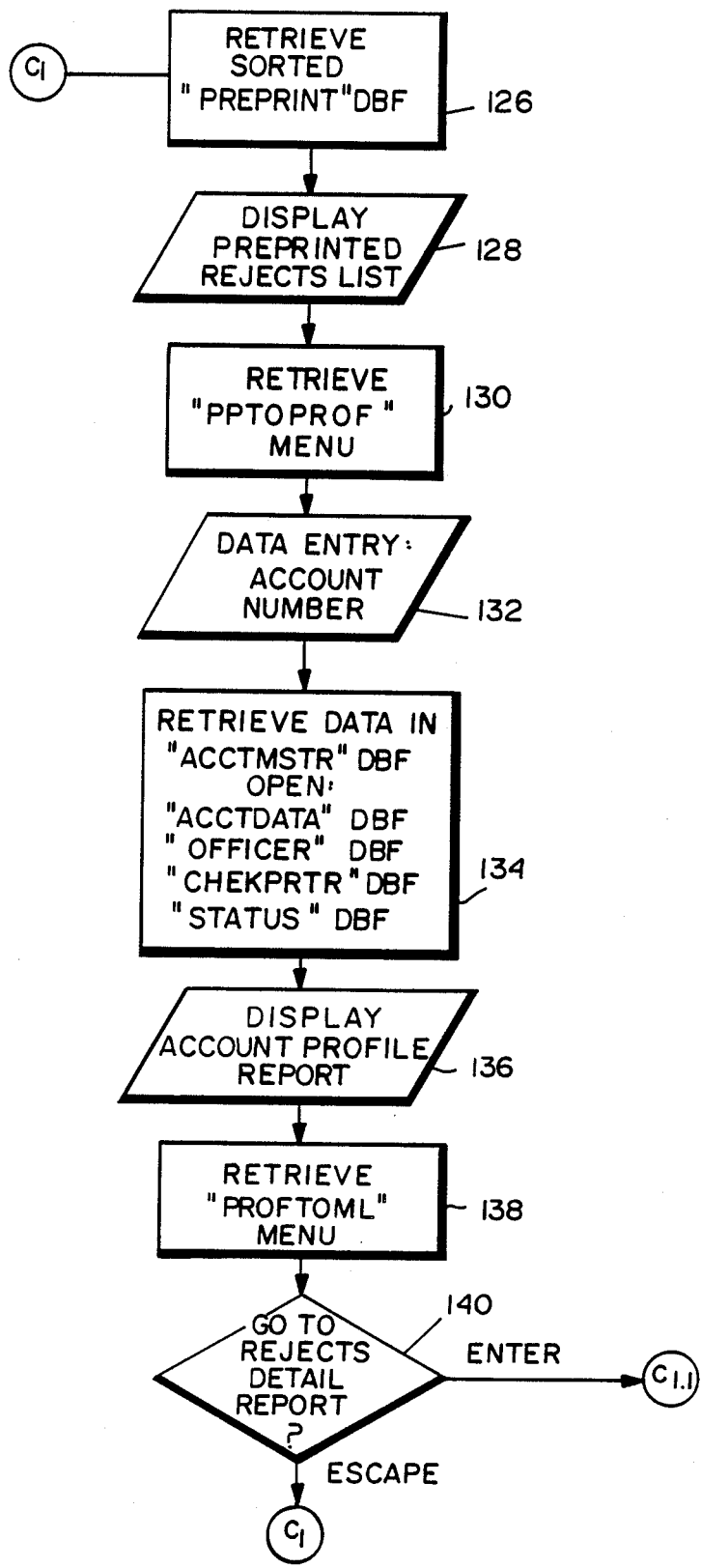

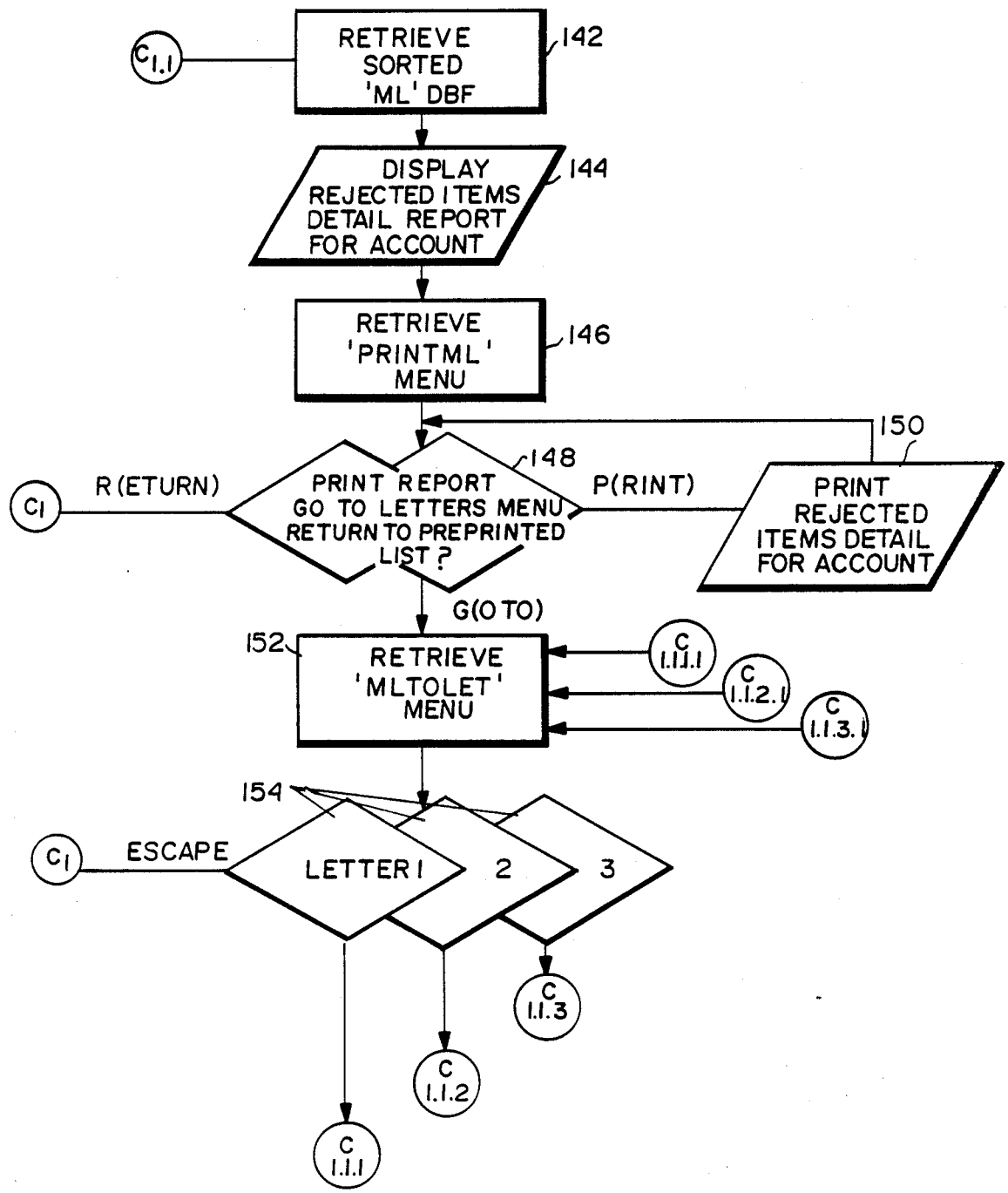
FIG. 6 PREPRINTED FLOW (continued) DAILY ROUTINE

FIG. 7 PREPRINTED FLOW
(continued) DAILY ROUTINE
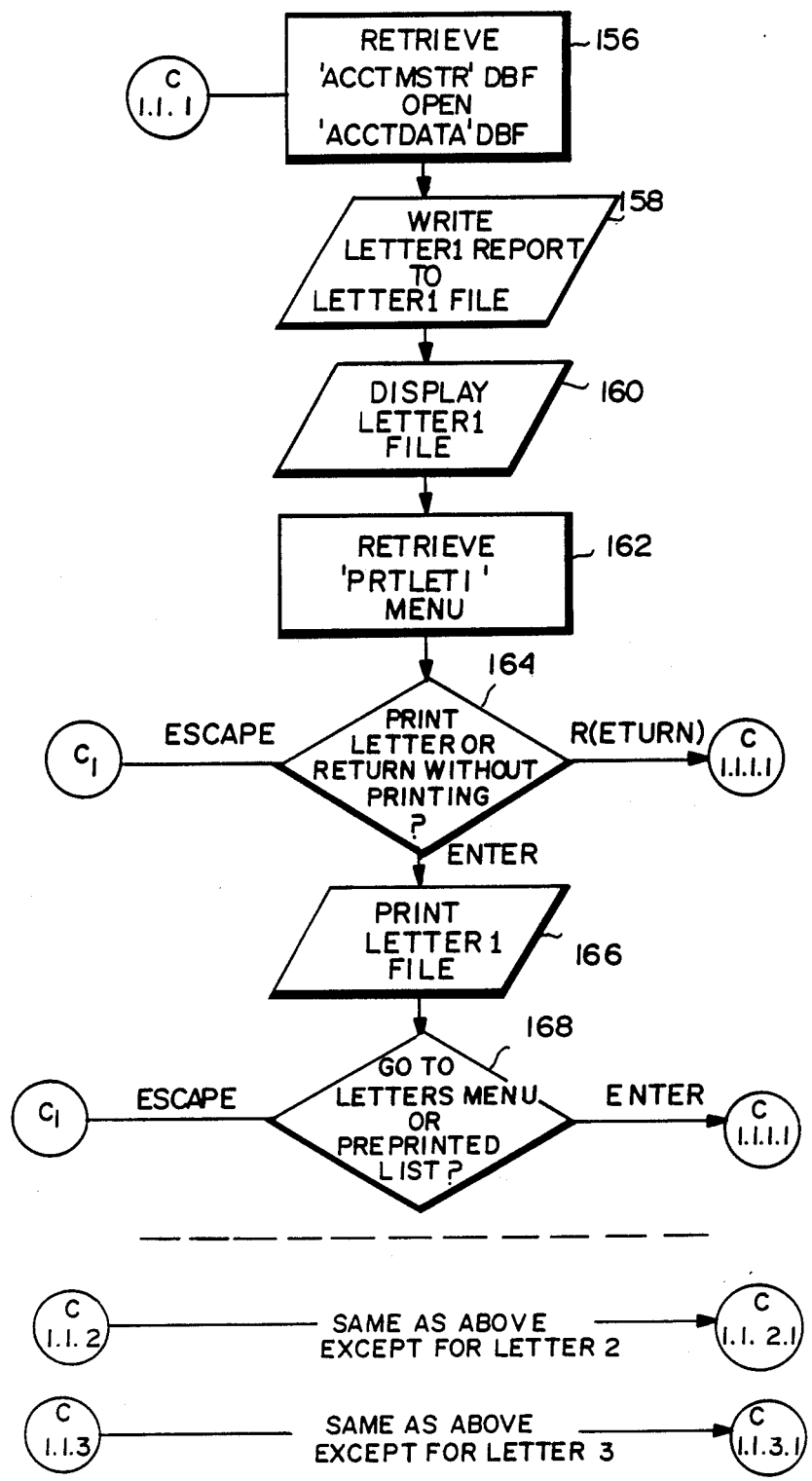

FIG. 8 ACCT. DATA / DATA BASE

| FIELD NAME | DATA SOURCE | DATA TYPE | MIN LEN | MAX LEN | DEC PT. | INDEX FILE | DUP KEYS | FLD REQ | PICTURES REPT EDIT |
|---|---|---|---|---|---|---|---|---|---|
| ACCT NUMB | KEYBD | NUM | 1 | 14 | | Y | N | Y | Y |
| D1V | KEYBD | NUM | 0 | 6 | | Z | | Z | Y |
| D1R | KEYBD | NUM | 0 | 5 | | Z | | Z | Y |
| D2V | KEYBD | NUM | 0 | 6 | | Z | | Z | Y |
| D2R | KEYBD | NUM | 0 | 5 | | Z | | Z | Y |
| ... | | | | | | | | | |
| D7V | KEYBD | NUM | 0 | 6 | | Z | | Z | Y |
| D7R | KEYBD | NUM | 0 | 5 | | Z | | Z | Y |
| M1V | KEYBD | NUM | 0 | 7 | | Z | | Z | Y |
| M1R | KEYBD | NUM | 0 | 6 | | Y | | Z | |
| M2V | KEYBD | NUM | 0 | 7 | | Z | | Z | |
| ... | | | | | | | | | |
| M12V | KEYBD | NUM | 0 | 7 | | Z | | Z | Y |
| M12R | KEYBD | NUM | 0 | 6 | | Z | | Z | Y |
| L DATE | DERIVED | NUM | 0 | 5 | 0 | Z | | Z | Y |
| L7V | DERIVED | NUM | 0 | 6 | 0 | Z | | Z | Y |
| L7R | DERIVED | NUM | 0 | 5 | 0 | Z | | Z | Y |
| YTDV | DERIVED | NUM | 0 | 8 | 0 | Y | Y | Z | Y |
| YTDR | DERIVED | NUM | 0 | 6 | 0 | Y | Y | Z | Y |

TOTAL FLDS: 44    REAL FLDS: 39    TOTAL LEN: 277    REAL LEN: 247

| Field Name | Data Source | Data Type | Min Len | Max Len | Dec Pt. | Index File | Dup Keys | Fld Req | Pictures Rept | Edit |
|---|---|---|---|---|---|---|---|---|---|---|
| ACCTNUMB | Keyboard | Num | 1 | 14 | | Y | N | Y | Y | |
| ACCTNAME | Keyboard | Text | 3 | 30 | | Y | N | Y | Y | |
| ADDRESS1 | Keyboard | Text | 5 | 25 | | N | | Y | Y | |
| ADDRESS2 | Keyboard | Text | 0 | 25 | | N | | N | Y | |
| CITY | Keyboard | Text | 3 | 15 | | N | | Y | Y | |
| STATE | Keyboard | Othr | 2 | 2 | | N | | Y | | |
| ZIP | Keyboard | Othr | 5 | 5 | | N | | Y | | |
| PHONE | Keyboard | Othr | 12 | 12 | | N | | Y | Y | Y |

| Field Name | Data Source | Data Type | Min Len | Max Len | Dec Pt. | Index File | Dup Keys | Fld Req | Pictures Rept | Edit |
|---|---|---|---|---|---|---|---|---|---|---|
| EXT | Keyboard | Num | 0 | 4 | | | | | | |
| CONTACT1 | Keyboard | Text | 0 | 20 | | | | | | |
| CONTACT2 | Keyboard | Text | 0 | 20 | | | | | | |
| YEAROPEN | Keyboard | Num | 0 | 4 | | | | | | |
| SALUTATION | Keyboard | Text | 0 | 25 | | | | | | |
| OFFNO | Keyboard | Num | 1 | 3 | | N | | Y | Y | |
| PRTRNUMB | Keyboard | Num | 1 | 4 | | N | | N | Y | |
| PORC | Keyboard | Text | 0 | 1 | | N | | N | Y | |

Total Flds: 16   Real Flds: 16   Total Len: 209   Real Len: 209

FIG. 9

"ACCTMSTR" DATA BASE
FIELD NAMES, DESCRIPTIONS AND SIZES

FIG. 10

ML DATA BASE

| Field Name | Data Source | Data Type | Min Len | Max Len | Dec Pt. | Index File | Dup Keys | Fld Req | Pictures Rept | Edit |
|---|---|---|---|---|---|---|---|---|---|---|
| ACNO | Keyboard | Num | 1 | 14 | | Y | | Y | Y | Y |
| SEQ | Keyboard | Text | 5 | 14 | 0 | N | Y | Y | Y | Y |
| SNO | Keyboard | Text | 0 | 21 | 0 | N | | N | Y | Y |
| RAT | Keyboard | Text | 0 | 11 | 0 | N | | N | Y | Y |
| ANO | Keyboard | Text | 0 | 14 | 0 | N | | N | Y | Y |
| TRC | Keyboard | Text | 0 | 4 | 0 | N | | N | Y | Y |
| AMT | Keyboard | Text | 0 | 12 | 0 | N | | N | Y | Y |

Total Flds: 7  Real Flds: 7  Total Len: 90  Real Len: 90

FIG. 11

| Sequence No... | Aux-On-Us (Ser.No).. | Rtg. & Trans. | On-Us (Account No.) | Trancode | Amount |
|---|---|---|---|---|---|
| 320184337 (UNREP'D) | 1128*02 | 02100148* | 450450 | 025 | 0000318725 |
| 320184337 (REP'D) | 1128502 | 021001486 | 450450 | 025 | 0000318725 |
| 540973667 (UNREP'D) | 1128438 | 02100148* | 450450 | | 0000072525 |
| 540973667 (REP'D) | 1128438 | 021001486 | 450450 | | 0000072525 |
| 428554106 (UNREP'D) | 11284*9 | 02100148* | 450*50 | | 0000005513 |
| 428554106 (REP'D) | 1128459 | 021001486 | 450450 | | 0000005513 |
| 331876005 (UNREP'D) | 112847* | 021001486 | 45*450 | 035 | 0000067877 |
| 331876005 (REP'D) | 1128476 | 021001486 | 450450 | 035 | 0000067877 |
| 502821765 (UNREP'D) | 11284*3 | 02100148* | 450450 | | 0000004230 |
| 502821765 (REP'D) | 1128463 | 021001486 | 450450 | | 0000004230 |

ML.DBF - SHOWING DATA IN FIELDS

FIG. 12 DAILY ROUTINE - SCREEN 1

```
First Amalgamated Bank and Trust Company
DAILY REJECTS SUMMARY FOR MARCH 08, 1988

TOTAL ITEMS PROCESSED:   673,413
    REJECTED ITEMS:            9,525
    REJECT PERCENTAGE:           1.4

% of All
    Rejects Source      Rejects     Rejects

PREPRINTED           3,158        33.2
    PROOF DEPARTMENT     2,849        29.9
    BRANCH/AFFILIATES    2,656        27.9
    ITEM PROCESSING        862         9.0

End of Display . . . Press ⏎ (ENTER)
```

FIG. 13 DAILY ROUTINE - SCREEN 2

```
              M I C R / R A M S
    MICR Rejects Analysis and Management System ┌─────────────────┐
              │ REJECTS SOURCES │
              └─────────────────┘

Use ↓ and ↑ keys to highlight an Option and press ENTER to select it
         (or type number corresponding to Option)

To return to main Menu, press the "Esc" key

1-PREPRINTED
              2-PROOF DEPARTMENT
              3-BRANCHES/AFFILIATES
              4-ITEM PROCESSING
              5-DISPLAY GRAPH
              6-PRINT GRAPH
```

FIG. 14 DAILY ROUTINE PREPRINTED REJECTS

| ACCOUNT # | VOLUME | PRPRNTED REJ | OTHER REJ | REJ % |
|---|---|---|---|---|
| 450450 | 2,949 | 381 | 24 | 13.7 |
| 888880 | 1,676 | 251 | 29 | 16.7 |
| 294544 | 864 | 175 | 6 | 20.9 |
| 421108 | 1,492 | 155 | 18 | 11.6 |
| 270144 | 756 | 138 | 6 | 19.0 |
| 50660 | 147 | 108 | 0 | 73.5 |
| 12504 | 852 | 97 | 0 | 11.4 |
| 550000 | 524 | 77 | 6 | 15.8 |
| 155001 | 426 | 76 | 4 | 18.8 |
| 102951 | 639 | 59 | 0 | 9.2 |
| 581772 | 326 | 59 | 7 | 20.2 |
| 18643 | 680 | 58 | 0 | 8.5 |
| 105504 | 680 | 58 | 0 | 8.5 |
| 20326 | 680 | 58 | 0 | 8.5 |
| 63653 | 177 | 47 | 0 | 26.6 |
| 306582 | 188 | 46 | 3 | 26.1 |
| 107611 | 936 | 44 | 0 | 4.7 |
| 101248 | 299 | 43 | 0 | 14.4 |
| 14282 | 590 | 43 | 0 | 7.3 |
| 106621 | 379 | 42 | 0 | 11.1 |

KEY IN THE ACCOUNT NUMBER FOR THE ACCOUNT PROFILE YOU WISH DISPLAYED AND PRESS ENTER:

450450

(OR PRESS ESC TWICE TO RETURN TO THE REJECTS SOURCES MENU)

USE CURSOR KEYS TO PAGE THROUGH DISPLAY.   PRESS ENTER TO END........

FIG. 15 ACCTMSTR. DBF-SHOWING DATA IN FIELDS

```
                    ACCOUNT MASTER
                     EDIT FORM

Account Number:     450450
Account Name:       ALOCACOC USA
Address - Line 1:   1500 SOUTH AVENUE
Address - Line 2:   P.O. BOX 1352
City:               ATLANTA
State:              GA
Zip Code:           30315
Telephone:          404-529-2000
Extension:          283
Primary Contact:    J.R. WOODBINE
Backup Contact:     PAULA SIMMS
Year Opened:        1902
Salutation:         Mr. Woodbine
Bank Officer Number: 3
Check Printer number: 110
Pers. or Comm.      C
```

FIG. 16 OFFICER. DBF-SHOWING DATA IN FIELDS

```
              OFFICER
              =======
         Standard Input Form

OFFNO(I):1
LNAME(T):DICKSON
FNAME(T):AL
 BKNO(I):1
```

FIG. 17 CHEKPRTR. DBF-SHOWING DATA IN FIELDS

```
              ┌─────────────────┐
              │    CHEKPRTR     │
              │    ========     │
              │ STANDARD INPUT FORM │
              └─────────────────┘

PRTRNUMB(I):300
PRTRNAME(T):GROUP BUSINESS FORMS
ADDRESS1(T):7690 FAIRFIELD DRIVE
ADDRESS2(T):P.O.BOX 123
    CITY(T):DUNMOORE
   STATE(S):GA
     ZIP(Z):30124
   PHONE(P):404-694-8698
 CONTACT(T):HARRY GROUP
   ESAPU(T):A

NOTE:  "ESAPU" IS A SINGLE-LETTER CODE REPRESENTING
           PRINTER'S QUALITY RATING BY BANK - E=EXCELLENT,
           S=SATISFACTORY, A=AVERAGE, P=POOR, U=UNSATISFACTORY
```

FIG. 18 "STATUS" DATA BASE, FIELD NAMES, DESCRIPTIONS & SIZES

| Field Name | Data Source | Data Type | Min Len | Max Len | Dec Pt. | Index File | Dup Keys | Fld Req | Pictures Rept | Edit |
|---|---|---|---|---|---|---|---|---|---|---|
| ACCTNUMB | Keyboard | Num | 1 | 14 | | Y | N | Y | | Y |
| ACS | Keyboard | Text | 0 | 1 | | | | | | |
| LASTCON | Keyboard | Text | 0 | 8 | | | | | | |
| TYPE | Keyboard | Text | 0 | 8 | | N | | N | | Y |

Total Flds: 4    Real Flds: 4    Total Len: 31    Real Len: 31

FIG. 19 DAILY ROUTINE - SCREEN 6

```
L--------------T--+-----------------R
            ACCOUNT DATA PROFILE AS OF MARCH 09, 1988

ACCOUNT NUMBER:      450450  ACCOUNT NAME:  ALOCACOC USA
                             ADDRESS:       1500 SOUTH AVENUE
CONTACT 1-J.R.WOODBINE                      P.O. BOX 1352
CONTACT 2-PAULA SIMMS                       ATLANTA       GA 30315
ACCOUNT OPENED:      1902    TELEPHONE:     404-529-2000

REJECTS         VOLUME          REJECTS %
YESTERDAY:             381          2,949             12.9
LAST 7 DAYS:         1,196          9,899             12.1
THIS MONTH:          3,787         32,876             11.5
LAST 12 MONTHS:      9,583        366,857              2.6
DATE OF LAST ITEM ACTIVITY:  MARCH 09, 1988

ADV/CHG STATUS:  C    LAST LETTER/TELCALL:  02/14/87   TYPE: CHG L1
BANK OFFICER:  DENISE JONES
CHECK PRINTER: DELUXE CHECK PRINTERS INC.    ST PAUL MN

PRESS ⏎(ENTER) FOR DETAILED LIST OF THIS ACCOUNT'S REJECTED ITEMS
                                  OR
       PRESS "ESC" TO RETURN TO PREPRINTED REJECTS ACCOUNTS LIST
```

FIG. 20 DAILY ROUTINE - REJECTED ITEMS DETAIL

```
L----------------+---------------R
```

REJECTED ITEMS DETAIL for ACCOUNT # 450450
(Press PgDn to scroll, ENTER when finished)

| SEQ NO. | AUX ON-US | RTG & TRANS | ON-US | PC | AMOUNT |
|---|---|---|---|---|---|
| 111176560 | 00000518 | 062201148 | 450450 ↑ | | 0000517721 |
| 283940567 | 00000515 | 062201148 | 450450 ↑ | | 0000075000 |
| 338249305 | 00000504 | 062201148 | 450450 ↑ | | 0000075000 |
| 392845783 | 00000502 | 062201148 | 450450 ↑ | | 0000070000 |
| 414802525 | 00000510 | 062201148 ↑ | 450450 | | 0000075000 |
| 443893201 | 00000485 | 062201148 | 450450 ↑ | | 0000075000 |
| 514785003 | 00000503 | 062201148 | 450450 ↑ | | 0000050000 |
| 519720142 | 00000509 | 062201148 | 450450 ↑ ↑ | | 0000050000 |

FIG. 21 MAIN MENU
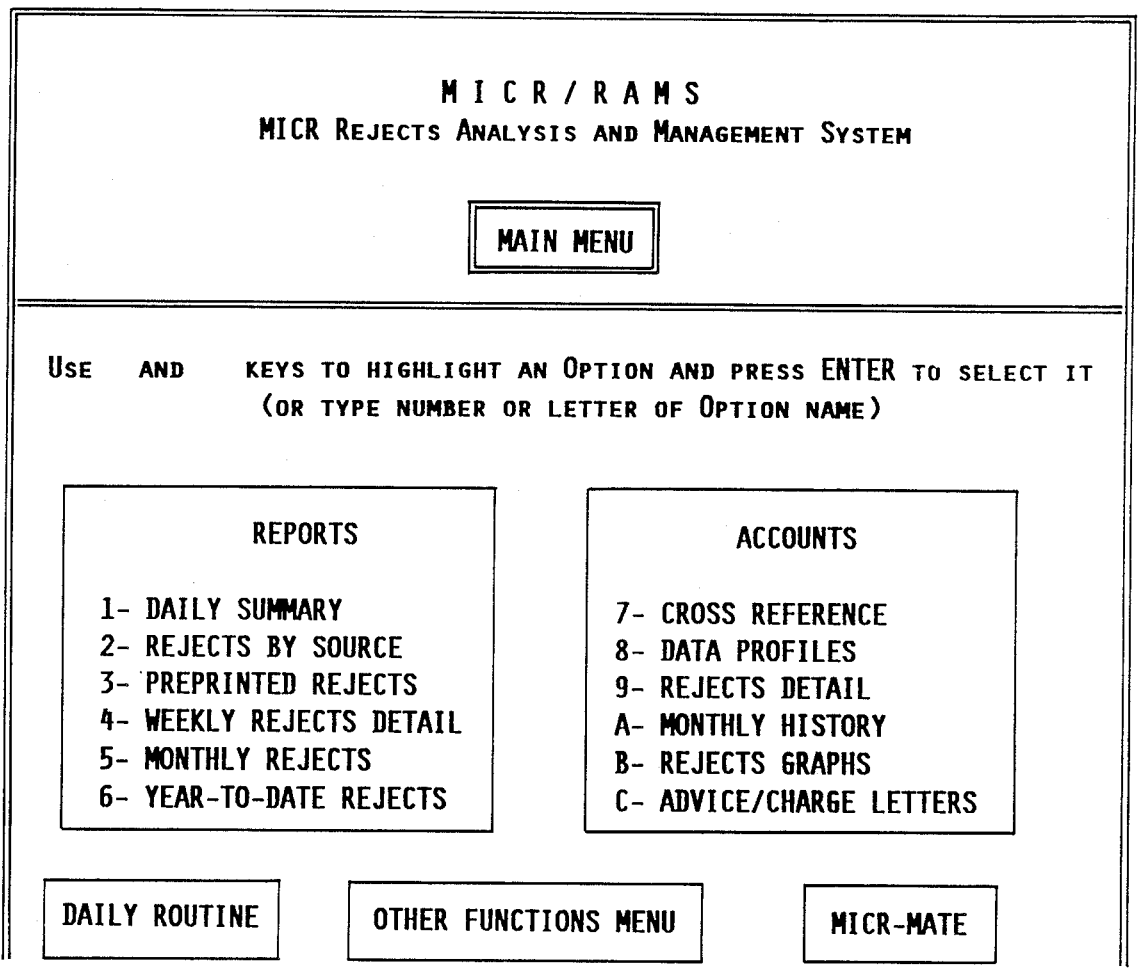

MICR REJECTS ANALYSIS AND MANAGEMENT INFORMATION SYSTEM

This is a continuation of application Ser. No. 07/177,298, filed Apr. 4, 1988, now abandoned.

FIELD OF THE INVENTION

This invention relates generally to magnetic ink character code recognition (MICR) systems. More particularly, the invention relates to a microcomputer based system for analyzing data related to items, e.g., checks, rejected by a MICR character reader as being non-readable.

BACKGROUND AND SUMMARY OF THE INVENTION

It is well recognized that Americans write more checks than any other people in the world. Untold billions of checks are processed each year through this country's payment systems. Due to the ever increasing number of new businesses which open checking accounts, each year check usage continues to grow despite the availability of paperless methods of transferring money.

The banking industry generally processes checks and other items which are encoded with magnetic ink character recognition (MICR) code. This code is printed on a wide variety of items with magnetic ink in a widely recognized machine language. Although hereinafter reference is typically made to MICR code in association with checks, it should be recognized that items such as bank money orders, travellers checks, and even non financial documents may be analyzed in accordance with the present invention. Such MICR encoded documents are typically read by a variety of reader/sorters which generate the necessary item processing data needed for electronically processing the item. In order to properly generate a MICR encoded band, there are requirements which must be complied with regarding the paper utilized, document dimensions, MICR band location, dimensions and format of the MICR characters, print placement, print specifications, magnetic ink, etc.

Inevitably, of the vast number of documents read, a small percentage, e.g., one and one-half percent, are rejected as not being readable. These rejects may be caused by any of a wide variety of problems. For example, the rejects may be due to poor quality paper. Such poor quality paper may leave voids in the printed characters, or be the cause for very irregular character edges. Rejects may likewise be due to paper that tears too easily or whose leading edge frays as the item travels through the sorter.

MICR rejects are additionally caused by a printed image that is uneven, i.e., where the iron oxide is not evenly distributed, has voids, is not spaced correctly, or by type that is too thick or thin, or by dimensional problems stemming from faulty composition or plate making. Additionally, MICR rejects are often due to unwanted magnetic signals caused by extraneous ink in the area sensed by the reader/sorter.

As a final example, MICR rejects may also be due to the printing system that is used to transfer the image to paper. For example, an impact printing system, such as letterpress, may create a depressed impression in the paper, referred to as a debossment, at a particular character position which may make the character magnetically non-readable.

For a relatively large bank which may process, for example, a million documents per day, a one and one-half percent reject rate equates to 15,000 rejected documents per day. Each of these 15,000 documents must be handled manually and a corrected MICR code must be placed on the document so that it may be reread.

Each of the documents read by a reader/sorter has applied to it an identifying number, often referred to as a spray number, which is associated with all processed items. Accordingly, a check which initially could not be read and was rejected, can be identified by the processor associated with the reader/sorter when the same check is submitted in corrected form.

Although some financial institutions that correct rejected checks rely on an essentially manual reject repair process, more modern electronic equipment both magnetic and optical character recognition techniques, is also utilized to electronically determine the correct MICR code. After determining the correct MICR code, a coded strip is often secured to the document so that it may be resubmitted to the reader/sorter.

By whatever mechanism the rejected checks or other documents are repaired or placed into a form where they may be resubmitted to a MICR reader/sorter, such an operation creates a significant financial drain on the individual financial institutions taking corrective actions. Even if the cost for processing each rejected document is far less than a dollar a document, the actual cost to a bank over time to process, for example, 15,000 rejected documents per day is a significant operating expense.

In view of these circumstances, there is a dire need for a system which contributes to limiting the number of MICR documents that are not readable as well as a system which improves reject document processing.

The financial institution main frame data processor associated with the institution's reader/sorters have, heretofore, captured data relating to rejected documents. Such rejected document data is typically stored based on the spray number assigned by the reader/sorter that attempted to read the document. Such rejected document data includes data identifying the financial institutions to which the document must be routed, account numbers, etc.

Such rejected document data has heretofore been printed out in reader/sorter spray number order in a voluminous compilation of rejected documents for a given day. Such a report is typically reviewed by the financial institution's quality control. These rejected document reports are typically generated on a daily basis.

No cumulative rejected document data reports are generated relating to specific customer accounts which are responsible for large numbers of rejected documents. Although daily rejected document data has been maintained indicating which characters in a variety of fields could not be correctly read, no prior art system utilized such data to aid financial institution quality control personnel in directly attacking this rejected document problem.

The present invention is a microcomputer-based system designed to satisfy the aforementioned needs of item processing quality control operations in banks and other MICR processing institutions. The system is interactive and menu driven and provides financial institution management and quality control personnel with a powerful tool to help manage and control MICR encoded document rejects to reduce the rate of such rejects to a minimum.

The microcomputer-based system is linked to the bank's main frame computer to form a multiprocessor system allowing quality control personnel to capture meaningful document reject data, to select and process specific reject information by account, internal source within the bank, and other categories. The system produces a variety of screen displays and printed reports detailing and summarizing significant reject data to provide an up to date perspective on reject control and measurement.

The reject analysis dedicated microcomputer is linked to the bank's main frame computer either directly or indirectly by utilizing a main frame generated item processing magnetic tape file. The microcomputer-based system may, for example, include a PC having a keyboard and a CRT display, a tape drive, a hard disk, an extended RAM memory, and a printer for generating advisory letters and other hard copy documents. The microcomputer-based system also includes a MICR reader and analyzer which permits rejected checks to be analyzed for their MICR quality.

In accordance with one exemplary embodiment of the present invention, a main frame item processing tape file is translated into a code compatible with the PC and read to the PC's hard disk memory where the data is assembled into unique data bases. After being loaded to disk, the system displays a daily summary report showing the total document items processed, the number of rejected items, as well as the rejected percentage. The summary display generically identifies rejected item sources and pinpoints those areas which require immediate attention.

Thereafter, the system interactively generates a series of display screens including a preprinted rejects report that identifies by account number, the accounts generating the highest number or percentage of rejected checks. In this fashion, the bank is able to quickly isolate those accounts having the most significant impact on its rejected items related operating expense.

By entering one of the account numbers identified on the preprinted rejects report, a user may retrieve up to date data relating to that account. The accessed account profile includes detailed data reflecting the account performance in terms of rejected items during the current month and over a predetermined period of time, e.g., twelve months. Additionally, the account profile also identifies the check printer for that account (who may be the source of the rejected check problem).

If further scrutiny of a particular account is desired, the system permits the operator to view a display of a list of the previous days rejected items for the account under review. The display shows each item's sequence number and displays the MICR line to identify which MICR characters were not read. In this fashion, the system allows the user to spot a rejected item error pattern in pre-printed or encoded MICR characters.

Additionally, in an exemplary embodiment of the present invention, identified rejected items from an account may be analyzed by a MICR character analyzer for their quality, so that a user can determine the precise reasons why certain characters within the MICR line were not read so that specific recommendations may be made to the customer and/or check printer for correction.

Finally, a user after reviewing an account's current and past rejected item status from previous displays may elect to print and mail any number of letters commensurate with the severity of the account reject situation. A printout of a sample of the MICR analysis of the accounts rejects may be included with the customer's letter as well as an indication of the penalties to be imposed on the customer if such rejects continue. In this fashion, the source of the costly rejected items is identified, and action taken to attack this problem to ultimately reduce the number of items which the MICR reader/sorter will not be able read.

BRIEF DESCRIPTION OF THE DRAWINGS

These, as well as other features of this invention will be better appreciated by reading the following detailed description of the preferred embodiment of the present invention taken in conjunction with the accompanying drawings of which:

FIGS. 1A and 1C are a schematic block diagram of another exemplary embodiment of the reject analysis and management data processing system of the present invention;

FIGS. 2A through 2C are flowcharts which delineate the sequence of operations performed in order to set up the system for interactive operation;

FIG. 3 is a flowchart showing the first interactive portion of the rejects analysis system;

FIG. 4 is a flowchart relating to the rejects sources analysis options available in the system;

FIGS. 5 through 7 are flowcharts delineating the sequence of operations if the preprinted option is selected;

FIG. 8 is a representation of the ACCTDATA data base;

FIG. 9 is a representation of the ACCTMSTR data base;

FIG. 10 is a representation of the ML data base;

FIG. 11 is a representation showing exemplary data in the fields of the ML data base;

FIG. 12 is an exemplary daily rejects summary display;

FIG. 13 is an exemplary reject sources menu;

FIG. 14 is an exemplary preprinted rejects list display;

FIG. 15 shows exemplary data fields in the ACCTMSTR data base;

FIG. 16 shows exemplary fields in the OFFICER data base;

FIG. 17 shows exemplary data fields in the CHKPRTR data base;

FIG. 18 is a representation of the status data base;

FIG. 19 shows an exemplary account data profile display;

FIG. 20 shows an exemplary rejected items detail display for the account shown in FIG. 19; and FIG. 21 shows an exemplary main menu.

DETAILED DESCRIPTION OF THE DRAWINGS

Figure 1A:
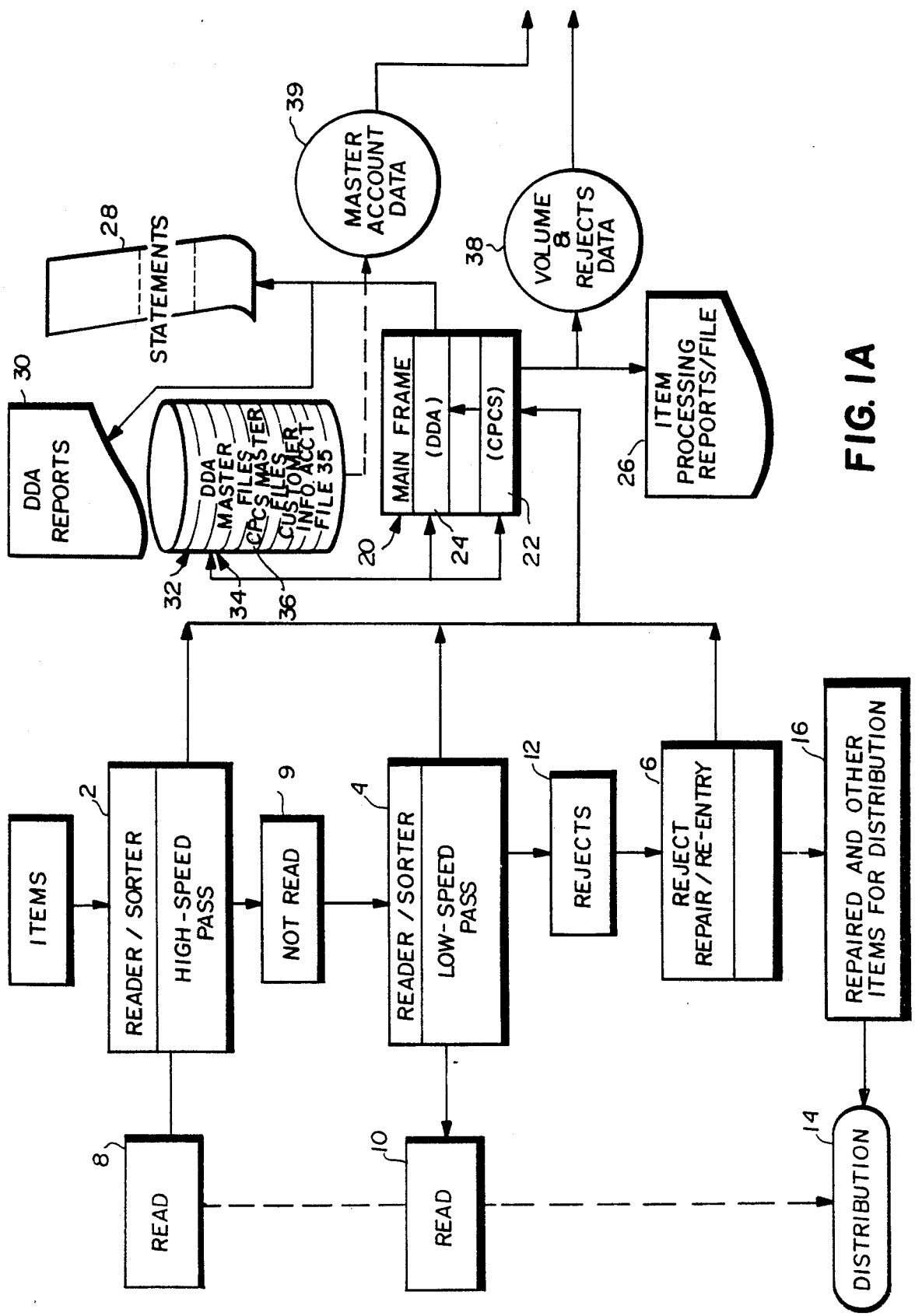
FIGS. 1A and 1B are a schematic block diagram of an exemplary embodiment of the rejects analysis and management data processing system of the present invention.
Figure 1B:
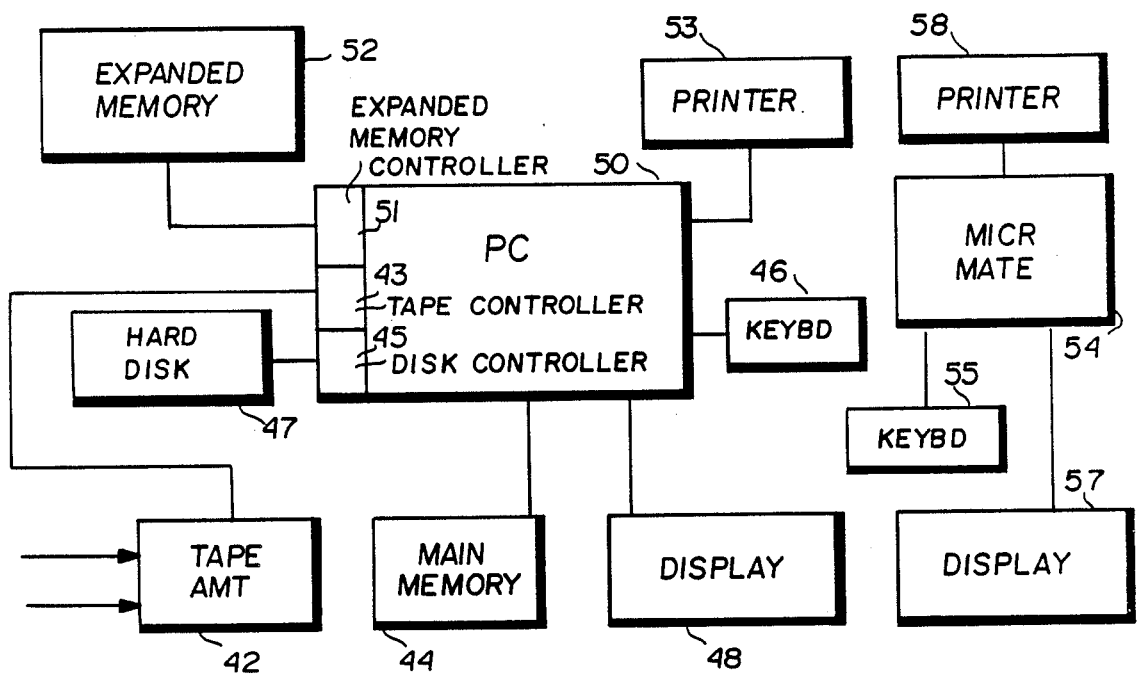

FIGS. 1A and 1B (or 1C) show a schematic block diagram of a financial institution's data processing system including a microcomputer-based subsystem for rejects analysis and management. As shown in FIG. 1A, a stack of items 1, e.g., checks, having MICR encoded data thereon are fed to a reader/sorter 2. Although two reader/sorters are shown in FIG. 1, it should be recognized that a financial institution may have any predetermined desired number of reader/sorters. Reader/sorter 2 may, for example, be a commercially available IBM 3890 reader/sorter.

Each check read by reader/sorter 2 is coded with a sequence number so that the check may be uniquely identified. The check is then read by a magnetic (and perhaps an optical) read head, and microfilmed. Those checks which have been correctly read are fed by the sorter portion of the reader/sorter 2 to a predetermined pocket as indicated at 8. Those checks which are not read are fed to a reject pocket as indicated at 9 in FIG. 1A.

Typically, a financial institution initially reads checks in a high speed pass where thousands of documents are read per minute followed by a low speed pass. Although FIG. 1A suggests that a separate reader/sorter 4 is utilized to perform the low speed pass, it should be recognized that the same reader/sorter used for the high speed pass may likewise be run at a lower speed to perform the low speed pass.

In the low speed pass, reader/sorter 4 receives those items not correctly read during the high speed pass, (e.g., those documents in reject pocket 9). During the low speed pass, the documents which are read are sorted to a pocket 10. Those items which still are non-readable are sorted to reject pocket 12 in low speed reader/sorter 4.

The reader/sorters 2, 4 each typically include a controlling CPU which controls the operation of its respective reader/sorter, while temporarily capturing the MICR data read from the scanned checks. Each CPU after capturing the MICR data, must transfer such captured data since it does not have significant storage capacity and typically, immediately transfers such captured data to the financial institution's main frame data processor 20, as will be explained in further detail below.

As indicated above, a large bank may process a million items per day and approximately one and one-half percent of these items, e.g., 15,000, are ultimately rejected as not readable. The rejected items from the reader/sorter reject pocket 12 are then forwarded to the banks reject repair facility 6.

In the reject repair facility 6, the rejected documents are read visually, magnetically and/or optically to determine the identity of the MICR characters which could not previously be read. In many instances, a new MICR strip which may be read is placed onto the item being processed. This process may be performed manually, or manually with varying degrees of automation. In any event, the correct MICR code must be determined by the bank so that, for example, a correct account may be appropriately debited by the amount indicated on the check.

It should be noted that items which are physically repaired by the bank are typically limited to those items which are drawn on that particular financial institution. Items which are transferred to another bank for payment may be moved through the bank without physical repair. However, in order to determine the bank to which the item must be sent, if not physically repaired, the item must be at least electronically repaired to determine the correct MICR code. On such checks, an operator in the reject repair facility may well visually check the item and enter a correct code, for example, reflecting the amount of the check. The checks which have been accurately read (8 and 10), those which have been repaired and those which have not been physically repaired (16) are distributed to the appropriate financial institution as indicated generally at 14. In any event, the accurate data corresponding to information on the check is fed to the main frame data processor 20 as shown in FIG. 1A.

As shown in FIG. 1A, the financial institution's main frame processing unit with its main memory is generically indicated at 20. Resident in the mainframe program storage is a check processing control system (CPCS) 22 which handles data captured from the reader/sorters and the collection of such data. In addition to the reader/sorter interface software package, the main frame system also includes a demand deposit accounting (DDA) 24 software system that controls the actual posting to customer accounts.

The check processing control system 22 on a daily basis keeps track of all checks drawn on its home bank as well as those which must be transmitted elsewhere and additionally keeps track of rejected item data. CPCS 22 generates an item processing file/report 26 which is a voluminous record of all the data it has captured.

Additionally, CPCS 22 transfers account posting related data to DDA 24, which in turn generates data for customer statements 28 and DDA reports 30. The data captured by CPCS 22 and the data utilized by DDA 24 is stored in disk memory 32 which includes storage areas for DDA master files 34 and CPCS master files 36 as well as many other master files that are utilized by the financial institution's main frame 20.

As noted above, the check processing control system 22, in addition to generating the voluminous item processing reports 26, also maintains data related to rejected items in a separate data file as represented at 38. In one embodiment of the present invention, the rejects data file may be loaded onto a tape such as shown at 38, which may be physically transferred to the tape unit 42 associated with the microcomputer-based rejects analysis system 40. If desired, such reject data may be directly downloaded by CPCS 22 as will be appreciated by those skilled in the art.

As noted above, prior to the present invention, the bank quality control personnel had to manually review voluminous item processing reports to analyze the generated reject data organized in the order of identifying spray numbers assigned by the reader/sorters 2 and 4. The microcomputer-based reject analysis system 40 processes and analyzes reject data in an interactive, menu-driven system that provides quality control personnel in a financial institution with a powerful tool to help manage and control MICR encoded document rejects to reduce the rate of such rejects to a minimum.

Also, input to microcomputer-based system 40 is master account data file 39 which includes such information as customer name, address, etc. The master account data file 39 may obtained from a tape generated from the financial institution's customer information account file 35 that is stored in disk 32, or may even be a separately generated file keyed in from system 40. As will be appreciated by those skilled in the art, master account data may be electronically downloaded to system 40 or may be physically transferred via a tape, a floppy disk or the like, as shown at 39.

Figure 1C:
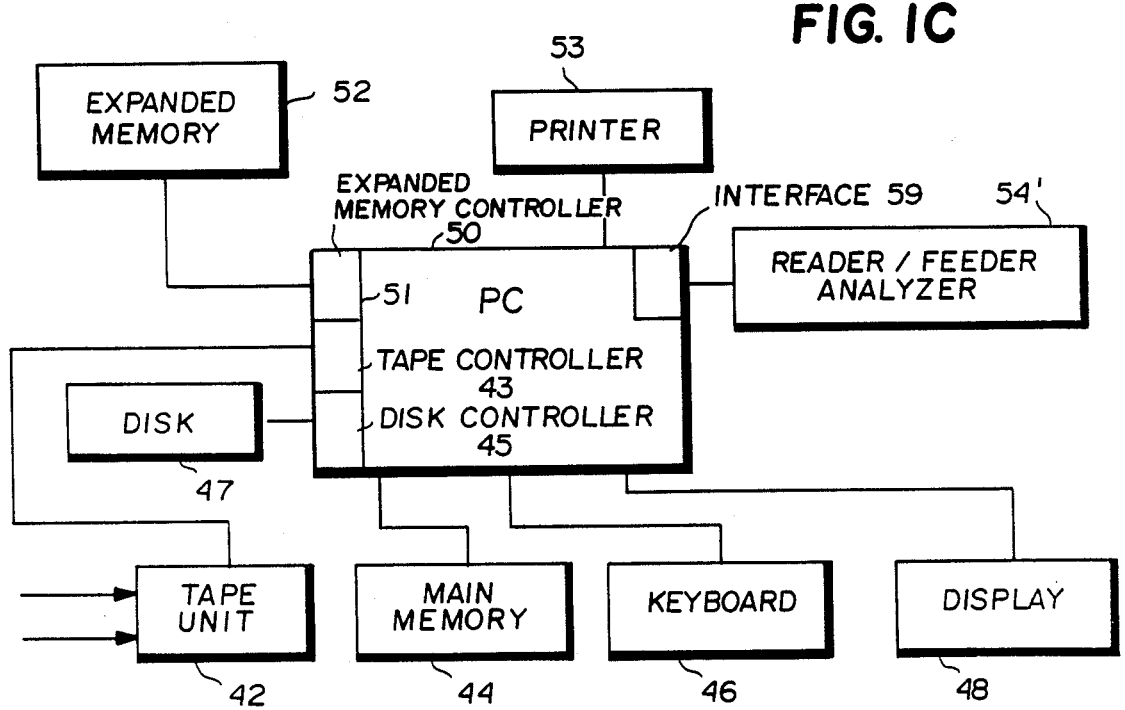

The microcomputer-based system 40 is contemplated, by way of example only, to be physically disposed in the financial institution to be used by quality control personnel. The microcomputer-based system may, for example, be implemented either as shown in FIG. 1B or 1C. Similar reference numerals have been utilized in both FIGS. 1B and 1C and only components which operate in a different fashion in the respective embodiments will be separately described.

Turning first to FIG. 1B, tape unit 42 may be a tape drive in which a tape reel is manually loaded upon operator actuation of a tape drive load key. Microcomputer 50, which may, for example, be a commercially available IBM PC, includes a tape drive controller 43. The tape drive controller 43, as will be appreciated by those skilled in the art, serves as an interface between the tape unit and the memory units 44, 47 and 52.

In accordance with the requirements of the MS/DOS operating system of the PC 50, the system 40 includes a conventional semiconductor main memory 44 including 640K bytes of storage capacity. The system 40 also includes 4 megabytes of expanded memory 52. Expanded memory 52 may be conventional semiconductor random access memory (RAM) devices which interface with the PC via an expanded memory controller 53. Also associated with PC 50 is a conventional hard disk 47 and disk controller 45.

The system 40 also includes a conventional keyboard 46, and CRT display 48 which allows an operator to interactively analyze and review reject information processed by PC 50 in a manner which will be described in detail below. The system 40 also includes a printer 53.

As will be discussed further below, the system software, the data bases and data structures utilized by the present system are stored in the memory devices 44, 47, 52 referred to above.

Also associated with PC 50 is a MICR code analyzer 54 which may, for example, be a commercially available MICR-MATE 1, which is an exemplary MICR code analyzer having an associated keyboard 55, display 56, and printer 58, and which is manufactured by Checkmate Electronics, Inc. With MICR-MATE 54, an operator is able to analyze rejected items (that are representative of a pattern of rejects for a given account) for their MICR quality. By using the MICR-MATE, a user can determine the precise reasons why certain characters within the MICR line were rejected. Specific recommendations may then be made to the account holder and/or check printer to correct the problem.

As will be explained in detail below, the present MICR reject analysis and management system groups together for a given account, the items which have been rejected for a given time period, e.g., current day, month, year. Once a sample of rejected items have been accessed, and run through the MICR-MATE 54, an exact diagnosis can be given as to why the item was rejected, e.g., low signal level. Although the MICR-MATE 54 allows a user to determine the precise reasons why a given item was rejected, it should be recognized that, if desired, the MICR rejects analysis and management system of the present invention can operate without MICR-MATE 54.

As will be appreciated by those skilled in the art, the MICR-MATE 54 may be utilized without its own separate keyboard, display, and printer, by sharing the PC's keyboard 48, display 48 and printer 53. Such an embodiment of the present invention is shown in FIG. 1C.

In one exemplary implementation of this embodiment, instead of the MICR-MATE executing its own analyzation software, the routines which the commercially available MICR-MATE currently executes are programmed in a PC compatible language and executed by the PC 50' shown in FIG. 1C. In this embodiment, the MICR reader/feeder 54' scans preselected MICR encoded items and feeds the data to be analyzed to PC 50' via interface 59 which provides the buffer storage and other interfacing functions required for fast data gathering and efficient processing by the PC.

In an exemplary implementation of the embodiment of FIG. 1C, reader/feeder 54' may have, for example, as many as 300 MICR encoded documents which have previously been rejected by reader/sorter 4 in FIG. 1A placed into its feeder tray. These documents are then sorted into 2 pockets, e.g., "readable" or "go" items into pocket 1 and "non-readable" or "no-go" items into pocket 2. Each item is triggered and fed past a read head when the previous item has been analyzed (e.g., at a speed of approximately 1 item per second). Programmable parameters may be utilized to preselect whether the items are "go" or "no-go". The analyzation data read is then fed to PC 50' via interface 59.

All analyzation data is buffered on the hard disk 47 and is separated into 2 files ("go" or "no-go") so that the "no-go" data is available for recall and visual analyzation on the CRT. Any or all of this data can be transferred to, for example, a floppy disk for permanent storage. The floppy disk data would be identifiable for retrieval purposes by, for example, account, serial number, etc.

Generalized (summarized) reject information would be generated for each "run" and may be displayed and/or transferred to floppy disk or printed out in response letters to the bank customer. This printed information may also include other data such as waveforms, etc. As will be appreciated by those skilled in the art, summarization data may also be formatted to generate a "MICR Analysis sheet" which would be forwarded to the customer along with an associated letter.

The specific manner in which mainframe reject data is processed and utilized is explained in detail below. With respect to an exemplary implementation of the embodiment of FIG. 1C, it is noted that the PC buffers individual check reject data including data relating to individual missed characters.

Analyzation data from reader/feeder 54' is received and compared with this mainframe reject data. Each rejected character, as identified by the mainframe reject data, is analyzed based on the data from reader/sorter 54' to, for example, identify that the character is an extra wide, out of specification character. Such data together with general information about the MICR printing on the document is summarized and buffered. An operator can then review the analyzed data (document by document) and elect whether or not to print a letter to the customer.

As will be explained in detail below, the MICR rejects analysis system of the present invention, provides a listing of the worst accounts in descending order of number of rejected items. It is noted that such reject data may be queued up to provide a buffer of data for the reader/feeder 54' to "look at". In this regard, data on, for example, the "50" worst accounts is put into RAM each day. Within this data are all of MICR lines from the rejected checks. The MICR rejects analysis program designates the errors causing the reject and instructs the reader/feeder 54' analysis program to save only the analyzed data on the MICR character, characters or characteristics which caused the reject. This data along with some general data such as average signal level of the document and each field, grossly wide or narrow characters or strokes, exceedingly bad waveforms or other generally bad characters will be buffered for later inclusion in a customer letter and MICR report form.

The flowcharts in FIGS. 2A through 2C, and FIGS. 3 through 7 disclose an exemplary embodiment of the sequence of operations performed by PC 50 in the embodiment shown in FIG. 1B under the control of the MICR rejects analysis and management system software.

Figure 2A:
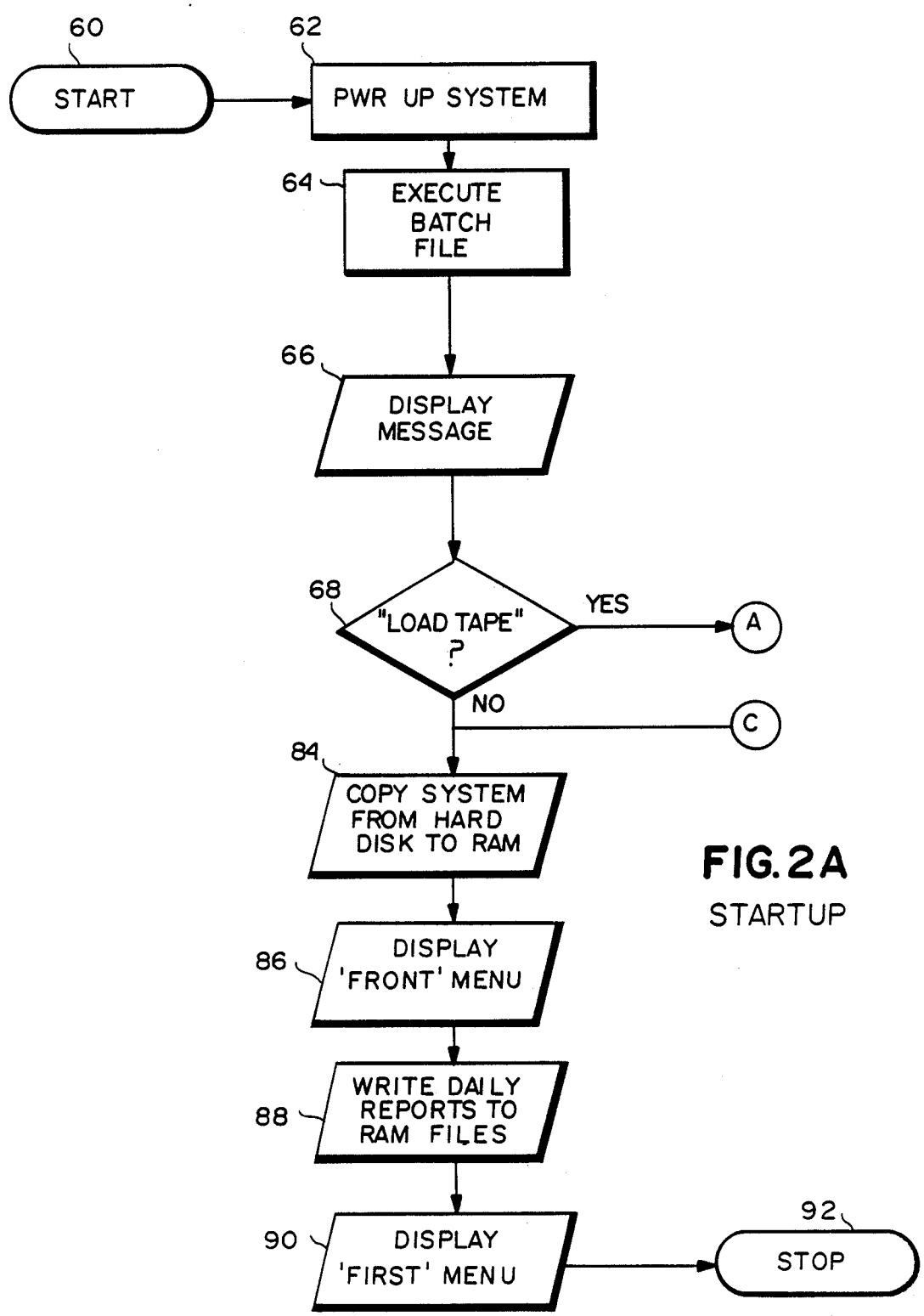

Turning first to FIG. 2A, upon turning the power on, the PC's operating system MS/DOS is loaded into main memory 44 from hard disk 47 (60, 62). Once loaded into main memory 44, DOS in turn executes a routine referred to as "batch file" at block 64 which controls the remainder of the startup procedure shown in FIGS. 2A through 2C.

Execution of this batch file routine sets up the system for performing rejects analysis by initializing the device drivers 43, 45, and 53 which control the operation of tape unit 42, hard disk 47 and expanded memory 52, respectively. Additionally, the batch file routine serves as an interface with the current rejects analysis software described in these flowcharts and the MS/DOS operating system so as to make the present system utilizable on any PC compatible processor.

As indicated at block 66, the user is then prompted to either load or not load the mainframe data tape via tape unit 42 to read reject data into the MICR reject analysis and management system 40 (hereinafter MICR/RAMS). The user is given the option to bypass the tape loading operation in the event that an power outage has occurred following an initial mainframe data transfer (so that it is unnecessary to perform the data transfer again). In this regard, it is noted that the tape loading operation for larger banks may take a considerable amount of time, e.g., one hour.

If the user chooses not to load the tape (68), this indicates that the tape has already been loaded and that the data for the day has already been captured. If the user indicates that he would like to load the tape, then the routines shown in FIG. 2B and 2C are executed.

The mainframe data tape contains two major files containing data captured during the previous days item processing operations as described above with respect to FIG. 1. These files contain data relating to all items processed as well as rejected items (including items which have been physically repaired and those which have not been repaired) and items from the master account file 39. The mainframe data stored on the tape is in a variety of formats and styles which are not PC compatible. In this regard, it is noted that most mainframe computers store information in EBCDIC code whereas PC's use ASCII code.

Turning to FIG. 2B, the user is prompted to mount the tape on tape unit 42 and to strike a key to initiate reading of the tape (70). The tape is then read and copied directly to hard disk (71).

With respect to the data that has been transferred to disk, as indicated at block 72, a rejected items file (referred to in the flowchart as the before/after or the BA file) is sorted by both account number and sequence or spray number. The BA file includes two nearly identical records for each rejected item.

The "before" record of the BA file is a rejected item record that includes a flag at the character position(s) that could not be read and the "after" record is a record that includes the same rejected item information with the correct character inserted at the flagged position (a correct MICR code ultimately needed to be determined so that appropriate data is posted). Thus, the "before" and "after" records relate to the unrepaired MICR code image and the repaired MICR code image, respectively. With respect to block 72, it is further noted that any other files which are provided by the mainframe that are not provided in account number order are likewise sorted by account number.

As indicated at block 73, certain predefined files in the system are opened and other files are created. With respect to the files that are opened, the BA file described above is opened, as is a raw volume file RV, that includes data relating to the total volume of items processed and reject analysis data related to these items. Additionally, an ACCTDATA data base file is opened.

In order to clearly exemplify the nature of the MICR/RAMS data base format (and the daily updating of MICR/RAMS history files, such as occurs in blocks 76 and 77 below), reference is now made to the "ACCTDATA" data base shown in FIG. 8. The underlying data stored in the FIG. 8 data base relates to the customer account identified in the field "ACCTNUMB".

During the updating of this MICR/RAMS data history file for this account, as indicated by field D1V, the current daily volume of items processed is loaded into the D1V field. Additionally, the D1R field is loaded with the number of items which have been rejected for the identified account number.

During the updating of this data base, the data previously stored in the D1V and D1R fields are shifted to the D2V and D2R fields. In turn, the data that was stored in the D2V and D2R fields are shifted to the D3V and D3R fields, etc.

At the same time the daily volume and daily rejected figures are shifted, the current volume is loaded into the M1V and M1R fields, which serve as cumulative fields for the current month. After a months worth of accumulated data has been stored, the M1V and M1R data is shifted to the M2V and M2R etc., until 12 months worth of data is accumulated.

Thus, the "ACCTDATA" data base shown in FIG. 8 serves as an ongoing history for each of the accounts. The account data base keeps track of the last date of activity in the account as indicated by the field Ldate. The field L7V reflects the last seven days volume and L7R indicates the last 7 days rejected volume. Year to date fields are also provided for the year to date total volume and year to date rejected volume.

The account number in the ACCTDATA data base is the field which links all the data bases in the system. In this regard, each of the data bases require an account number.

As shown at the head of the columns in FIG. 8, the ACCTDATA data base and other data bases in the system are structured to identify the following information: field name, data source, data type, minimum length, maximum length, decimal point, index type, duplicate keys, field required and pictures report and edit.

The data source field indicates whether the source of the data is derived or reflects raw data. The "keyboard"

entry in the data source column does not indicate that the data came from a keyboard but indicates that the data is raw data. The "derived" entry in the data source column indicates that the data is derived from other fields. In this regard, the L7V field which is indicated as being a derived field, is obtained by merely summing D1V through D7V.

The data type field indicates whether the data is numeric or textual data. The minimum and maximum length fields indicate the minimum number of digits and the maximum number of digits that are allowable in the field. As shown in FIG. 8, the account number data field may be up to 14 digits long while the daily volume of items processed may include 6 significant digits (i.e., up to 999,999).

Next to the maximum length column is a decimal point column indicating whether decimal points may be present in the field, followed by an index file column. The index file field indicates that a file is available containing the data in the ACCTDATA data base sorted by account number. Thus, the account data file may be read out in account number order.

The duplicate keys column indicates whether duplicate entries may be present in separate fields. For example, in the account field, duplicate account numbers are not permitted. However, the number of rejects in the first month of a given account (M1R) may be the same number of rejects as indicated in another month.

The "field required" is used for data entry purposes and indicates whether a field must be present or not. The "pictures report" column indicates that a field must be reported even if there is a zero entry. The edit field relates to the manner in which a field will appear on a display and is not utilized in the account data data base.

As indicated above, the data bases in the MICR-/RAMS system are linked by account number. Certain of these data bases are static files which need not be updated on a daily basis but which are utilized in MICR/RAMS by the system during interactive processing.

The ACCTMSTR data base shown in FIG. 9 is such a static data base. The contents of the ACCTMSTR data base is largely self-explanatory. Focussing only on the field names, the account master data base includes an account number field, and an account name field identifying, for example the corporate name of the account. Also included are two address fields for identifying the street address and a post office box address and fields for city, state, zip code, phone number and related extensions.

Contact fields are provided for identifying primary and back up contacts for the account. Also shown is a "Year open" field, and a salutation field indicating the persons name to whom letters relating to the account should be addressed.

Particularly unique fields in the ACCTMSTR data base are the "OFFNO" field which indicates the bank officer who was in charge of opening the account and a "PRTRNUMB" field which indicates the check printer number identifying the vendor that printed the checks. A "PORC" field is utilized which indicates whether the account is a commercial account or a personal account.

The check printer data base is another static data base which is provided for identifying each of the known commercial check printing firms, supplying their address, phone number, a party to contact and a code representing the printer's quality rating. The MICR-/RAMS system includes other data bases the most significant of which will be discussed below in the context of the description of the remaining flowcharts.

As indicated in FIG. 2b at block 73, one of the files that is created is the "ML" file. FIG. 10 shows the "ML" data base which stores data related to rejected items. As shown in FIG. 10, the "ACNO" field defines a particular customer account, the "SEQ" field defines the spray sequence number that uniquely identifies the item and which is placed on the item when it is initially read by reader/sorter 4 shown in FIG. 1A. The "SNO" field defines the serial number of the check. The "RAT" field defines routing and transit numbers which indicate the financial institution the item needs to be routed to. The "ANO" field defines an account number indicating that the item is an "on-us" item drawn on the bank's own account. The "TRC" field defines a transaction code which may, for example, indicate that the item has been deposited in a customer account. Finally, the "AMT" field indicates the amount of the item. By way of example only, FIG. 11 discloses a data structure showing exemplary data in the fields in the "ML" data base. In FIG. 11, for each pair of identical sequence numbers, the first relates to the unrepaired item and the second relates to the repaired item, the asterisk shows the MICR character that could not be read for each unrepaired item.

It should be recognized that the same mainframe data may be entered into multiple data bases. For example, for a given account number, rejected item data is entered into the reject field D1R in the ACCTDATA data base for a predetermined account number. Additionally, for example, the ML data base will record data regarding the rejected item. If the rejected item came from a particular branch of a financial institution, a BRANCH data base records such information. The BRANCH data base which is also created at block 73 identifies the particular branch, the volume of items processed and the number of rejected items. A flag field is stored in the data base indicating that the branch has, for example, a reject percentage above a predetermined threshold.

The PREPRINT, ITEMPROC, and PROOF files referred to at block 73 in FIG. 2B will not be discussed now since they are described in detail below in conjunction with the flowchart shown in FIG. 4. With respect to the SPECIAL file listed in block 73, this file is established to identify data that must be processed by a particular financial institution on a special basis. For example, this file may be utilized to keep track of processing items that are unique to that bank, such as, for example, items which have been pre-encoded by a particular bank customer. This file allows data to be accessed regarding rejected items associated with such a special customer relationship.

The "BIZARRE" file is a file that is used to store data with respect to rejected items for which it is not clear as to what category they rightfully belong due to problems in reading the code. The "BIZARRE" file is created so that erroneous totals will not be added to one of the other files. The DAILYSUM file is a one record file which is used to store the total volume of items processed, the number of rejects, and the reject percentage.

Thus, all the files which are created in block 73 are files which are created on a daily basis and contain no historical data. In contrast, the predefined AD file as described above includes historical account data.

After the above files have been opened and created, one record at a time is read from the BA and RV files (74). As each record is read, as indicated at block 75, the data is converted from EBCDIC code to ASCII code. In addition, compressed data files which are utilized by the mainframe are uncompressed and reformatted so that they are PC compatible. It is noted that the tremendous volume of data processed by the mainframe computer dictates that data compression techniques be utilized, for example, to compress rejected item data from several hundred bytes to less than a hundred bytes. Data is uncompressed by, for example, utilizing a table lookup procedure to determine the uncompressed reject data indicated by a compressed code. The converted mainframe data is interpreted and resolved into component parts which are categorized (e.g., as to type of reject, source of reject, etc.) and incorporated into the data base structures of the present MICR reject analysis management system. The data base format utilized in the present system is in dBASE III.

Turning to FIG. 2C, as indicated at block 76, the records which have previously been read and converted at blocks 74 and 75 are then matched by account number. Thus, a rejected file item is compared by account number with corresponding data in the raw volume file. This comparison insures that the rejected item data corresponds to an actual item in the raw volume file, to insure that the reject data actually reflects a rejected item and represents valid reject data.

If there is a match, appropriate rejected item and total volume fields are incremented to accumulate data field totals. In this regard, see the D1R and D1V fields in the ACCTDATA data base described above. Cumulative totals are also maintained in the other data bases described above to accumulate the reject information indicated by each of the records which have been read. In this manner all MICR/RAM history files are updated. The files for which totals are accumulated at block 76 include the previously described ML, AD, PREPRINT, PROOF, ITEMPROC, SPECIAL and BIZARRE files. These totals are then written to each of these files as indicated at block 77.

The only data base which has not been updated above is the BRANCH file. This file is treated separately since one bank may have hundreds of branches and it is more efficient to update this file individually rather than in the previously described updating process. Thus, as indicated at block 78, a temporary file is written on disk including the before/after and raw volume data files. This data is then sorted in branch number sequence (79). The cumulative data regarding volume of items processed and number of rejects is accumulated by branch or affiliate number (80). This accumulated data is then written on disk in a branch or affiliate file (82).

Thus, after all the mainframe data has been converted into a format which is compatible with the MICR/RAMS data bases, the data is assembled and stored in such data bases on hard disk 47. These files include both history files which are maintained for a significant period of time as well as daily files which are available for a single day only and not thereafter maintained. As will be appreciated by those skilled in the art, the particular data chosen to be maintained or disposed of will vary from user to user.

Although the entire days processing is now stored on hard disk 47, such data may be more rapidly accessed if it were stored in expanded memory 52. Accordingly, as indicated at block 84 in FIG. 2A, all systems software and selected data base files are copied to expanded RAM memory 52. Data is transferred to expanded memory 52 based on its likelihood to be utilized during the given day's processing. In this regard, if 5,000 accounts generated rejected items during the current day, only data relating to, for example, the 200 with the most rejected items will be transferred to expanded memory 52. Thereafter, when a particular program or data base is required to be accessed, expanded memory 52 is initially searched for such programs and data to take advantage of the faster access time of the semiconductor RAM memory 52.

As indicated at 86, an introductory front menu is displayed for the user. At essentially the same time, the data which was previously copied to expanded memory 52 is reorganized in RAM 52 into word processing files instead of data base files improve the display response time of such files (88). The files which are manipulated at 88 are those which are to be repeatedly utilized on a daily basis. Thus, by rewriting into word processing format daily report files relating to pre-printed items, rejected items, errors in the proof department or local branches, daily summary reports, etc., permits faster access time during interactive operation with the user of the system. Thereafter, the first interactive display menu is displayed by the system (90) to thereby complete the startup preprocessing prior to interactive system operations (92).

Turning now to FIG. 3, the first interactive MICR/RAMS screen is displayed (94, 96). The first menu displayed gives the user a choice to go to a daily routine menu or a main menu (98). By striking the enter key, the operator selects the daily routine. If the operator selects the daily routine menu, as indicated at block 100, a program call is initiated which retrieves the daily summary report file, which, for example, may be a one record data base.

An exemplary daily summary report is shown in FIG. 12, this report displays for the operator the total items processed, the number of rejected items, and the reject percentage while also identifying the source of the rejects as being due to the pre-printed MICR code, the proof department, a branch or affiliate or the bank's item processing department. After the display of the daily summary report at 102, upon the user hitting the enter key, a summary menu is called (104) and displayed at the user's CRT 48.

An exemplary summary menu is shown at FIG. 13. This summary menu entitled "Rejects Sources" offers the user six options plus the opportunity to return to a main menu (which is described below in conjunction with FIG. 21) to bypass these options by pressing the escape key. The multiple decision blocks shown at 108 in FIG. 3 reflect the six options available to the user on the reject sources menu of FIG. 13.

Presuming that an escape to the main menu has not been selected, the PC determines which of the six options have been selected by the operator. Turning next to FIG. 4, before discussing the pre-printed option 110, the general nature of options 112-120 will initially be described.

In regard to the proof option 112, this option provides the user with a list of encoding machine identifying numbers within the bank, the number of checks passing through that encoding machine, the number of rejected checks attributable to that coding machine as determined by a reader/sorter to thereby isolate errors attributable to an encoding machine or an associated operator.

The display generated by choosing the proof option gives the bank's quality control personnel a quick view of the number of rejects generated by their proof department. For encoding machines which have a higher than a predetermined threshold error rate, a flag field is set and a corresponding indication is displayed. A similar display is generated at 114 upon the selection of the branch option except that instead of an indication of the performance of the proofing department, an indication of the performance of a particular bank branch is displayed. A typical display would include volume of items processed, number of rejects, percentage of rejects, and a flag indicating a higher than tolerable reject rate. The item processing option indicated at 116 generates a similar display with respect to the individual reader/sorters in the bank and similar data is generated with respect to each of these reader/sorters.

In regard to option 118, the user may select a display of the daily summary graph on CRT 48 which presents in, for example, bar graph fashion, the statistics discussed above with respect to the rejected items produced in the preprinted, proof, branch, and item processing categories. Finally, option 120 allows the user to receive a print out of the displayed daily summary graph.

Turning back to the proof option, if the user selects this option then the system performs the operations indicated at C2 and retrieves the proof report file that has been stored in word processing format in the expanded memory 52 for fast interactive access (122). Thereafter, the file is displayed at CRT display 48 (124), after which a return is made back to the Rejects Sources screen shown in FIG. 13, once again allowing the user to select one of the six options.

Selection of options 114, 116, 118, and 120 results in the execution of routines C3 through C6, respectively, which are similar to routine C2 except for the file which is retrieved and displayed (or printed).

Focussing now on the preprinted option 110, if this option is selected, the processing is more involved than in the aforementioned options. In this regard, for example, if the item processing option is selected, an unusually high error rate on a particular reader/sorter may rapidly lead quality control personnel to replacing or repairing the identified reader/sorter. However, errors which are uncovered in preprinted MICR items are due to errors that are out of the bank's immediate internal control.

The preprinted rejects option is a powerful tool in the MICR rejects analysis and management system of the present invention. With this option, the user may identify accounts having an abnormally high number of rejects, examine the account's reject trends, determine the account's check printing vendors, and bank officer in charge. The user may also view a list of each of the previous day's rejects by MICR line character errors and automatically create letters advising account holders of reject problems and related charges.

Turning to FIG. 5, as indicated at block 126, the first step in the preprinted rejects logic flow is the retrieval of the sorted "preprint" data base. A preprinted rejects list is thereafter displayed (128) such as, for example, shown in FIG. 14. As can be seen in FIG. 14 the list is sorted in the order of highest number of rejects. The rejects lists identifies the customer's account number, the volume in the account, the number of rejects due to preprinted MICR code errors, other rejected items in the account, and the percentage of rejected items.

A user can scroll down the screen to view further accounts having rejected items. However, bank quality control personnel would primarily be interested in the accounts appearing on this first screen, i.e., those having the highest total number of rejects, since these accounts are costing the bank the most money.

At this point, the user has identified accounts having a large number of rejects. To determine the cause and nature of the rejects, each of these accounts must be reviewed in considerably more detail. In this regard, it is noted that the data shown in FIG. 14 just relates to the previous day's number of rejected items. It can not be ascertained from this data whether the account has a past history of rejected check problems or if this data represents an aberration from prior account performance.

In order to gather the necessary information for determining trends in a given account and attacking the source of the rejected item problem, it is necessary to assemble information from a number of the systems data bases. After the preprinted rejects list shown in the left hand side of FIG. 14 has been displayed, the system retrieves the menu shown on the right hand side of FIG. 14. This menu prompts the operator to key in the account number for the account profile that the user wishes to have displayed in further detail (130).

After the operator has entered the account number (132), the system compiles an account data profile report using the ACCMSTR data base file shown in FIG. 9 and selected fields from the ACCTDATA, OFFICER, CHEKPRTR, and STATUS data bases. Thus, in response to the entry of the account number, the account master data base is opened as well as the account data, officer, check printer and status data bases. Self explanatory examples (in view of the previous description) of data in the fields from these data bases are shown in the drawings, where FIG. 15 shows the data from the ACCTMSTR data base. FIG. 16 shows data and fields from the OFFICER data base and FIG. 17 shows data. from the CHEKPRTR data base, while FIG. 18 shows the account STATUS data base.

Data from these data bases are assembled to produce the Account Data Profile report that is displayed at CRT 48 and shown in FIG. 19 (136). As can be seen from the account data profile in FIG. 19, information displayed in this profile is based on a combination of data from each of the above data bases.

For example, from the ACCTDATA data base, the data profile listing of rejects, volume and percentage of rejects is obtained. Based on the rejects data shown in FIG. 19, quality control personnel can determine the rejected item trend based on the number of rejects in the Yesterday, Last Seven days, This Month, and Last Twelve Months fields.

Upon reviewing the account profile report at 136, the user will determine whether there is a disturbing trend in rejects. Additionally, the user can determine when the last point in time that the account holder has been contacted, either by a letter or telephone call.

The user may press enter to retrieve a detailed list of this accounts rejected items (138). Upon striking the enter key. If the user elects to go to the Rejects Detail Report at 140, as shown in FIG. 6, a detailed listing of the account whose data profile has just been viewed is retrieved from the ML data base as shown at 142. An exemplary detailed listing of items from the ML data base (see FIG. 10) is shown in FIG. 20. Such a listing is displayed at 144 in FIG. 6.

As shown in FIGS. 14 and 19, account 450450 had 381 items rejected during the previous day. FIG. 20 gives quality control personnel the opportunity to focus in detail on each of the rejected items.

MICR characters which could not be read are reflected by arrows shown in FIG. 20. A particular item having no arrows may reflect that an error checking procedure revealed an error other than a character reading error. The display in FIG. 20 shows the rejected items sequence (spray) number, each MICR band field of the repaired item and arrows below each character of the MICR band that indicate which character(s) were unreadable or were misread on the original (unrepaired) item. The flags in FIG. 20 that indicate which character was nonreadable for each sequence number are generated by a comparison of the mainframe data relating to the initial attempt to read the item with the data on the item after it has been repaired. Differences between these readings are identified in which character could not initially be read.

The present invention contemplates a yet further detailed analysis of rejected items. In this regard, for example, the rejected items for account number 450450 are retrieved and identified by sequence number to insure that the item appearing on the screen is the item retrieved.

If most of the rejected items show that characters were not readable in a particular field, it is desirable to run a rejected item having a character which was not readable in that field through the MICR-MATE 54 shown in FIG. 1B. By running such items through the MICR-MATE 54, it can be determined, for example, that the reason that a particular character could not be read is because of a low signal level, irregular waveforms, inconsistent signal level, etc.

Quality control personnel can then conclude that the commercial customer's printer has clearly identifiable problems which have resulted in characters that cannot be read. Since the MICR/RAMS system stores detailed information relating to the customer account contact and the printer utilized by such an account, it is then possible to contact the customer account holder and convey specific enough information so that the printer can resolve the problem. Alternatively, the customer may be motivated by one of a series of letters to find a new printer.

By running such items through the MICR-MATE, the possibility of the reader/sorter being miscalibrated and therefore not correctly reading the items is eliminated. The analog display of the MICR-MATE permits the quality control personnel to determine that the failure to read a particular character is due to a printer error, where, for example, the character had insufficient magnetic material content to be read by the magnetic read head of the reader/sorter.

The combined information from the stored data bases and the MICR-MATE display printout provides a check printer with a key as to how to cure a problem as well as motivation to cure the problem. The account holder is motivated to see that the problem is cured in order to avoid charges against his or her account, as will be explained further below.

Turning back to FIG. 6, after the rejected items detail report and the MICR-MATE printout have been reviewed, a "PRINTML" menu is retrieved at 146. This menu prompts the user to print the previously described rejected items detail list or go on to the "letters" menu as will be described below, or alternatively return to the preprinted rejects lists.

If printing of the rejected items list is selected, the list is printed in its entirety as indicated at 150 and the "PRINTML" menu is again displayed. If the "letters" menu is selected at 148, the "ML TO letters" menu is retrieved and displayed.

This screen offers quality control personnel a choice of three precomposed boiler plate letters depending on the severity of the reject problem and whether any previous letters have been sent. Once the letter select menu is retrieved and displayed (152), the user has the option of selecting one of three form letters (154).

If the first form letter is selected, as shown in FIG. 7, the ACCTMSTR data base is retrieved and the ACCTDATA data base is opened (156). With the accessing of the account master data base, construction of a personalized letter is initiated. The data from the ACCTDATA data base and the ACCTMSTR data base are inserted at appropriate portions of the letter to create a word processing file for a personalized letter (158) which may be displayed (160) and modified by the user. Thus, in the form letter, the name and address of the customer is retrieved from the data bases as well as the appropriate salutation and detail reject data relating to the account.

At block 162 a menu is retrieved which permits the user to print the letter as displayed at 160 or return to the previous menu without printing (164). If at 164, the user decides that he would prefer a letter 2 or letter 3 format, then by hitting the return key, the routine reenters block 152 of FIG. 6 (giving the user the opportunity to select letters 1, 2, or 3 at block 154.

If the user decides to print the letter, the enter key must be hit which initiates the printing of letter 1 (166). Afterwards the user may go back to the letters menu by hitting the enter key at 168, or may return to the preprinted list at block 148 of FIG. 6. The same logic flow shown in FIG. 7 applies if letter 2 or letter 3 is selected at block 154 in FIG. 6. The only difference if letter 2 or letter 3 is selected is that a different file would be accessed in retrieving the second or third letter.

The content of the letters will vary in that the letter 1 is typically designed to be an initial letter informing the customer of the rejected check problem and the resulting added cost to the bank as well as the delays in processing the check for payment. The customer is also informed that the rejects are due to causes which are in fact preventable, e.g, those due to improper printing of the magnetically inked number and symbols which appear at the bottom of the check. The user would then be given the reject data relating to the account as well as electronic snapshots of sample rejected checks perused by the MICR-MATE. The customer is then asked to review the checks with his check printer. The second and third letters are considerably stronger, ultimately assessing charges against commercial customer accounts which exceed a predetermined threshold number of rejected checks.

The main menu referenced in the flowcharts of FIG. 3 and FIG. 4 is shown in FIG. 21. The main menu is provided to allow the user to access all the above described information directly without the necessity of following a preset path. In this regard, by requesting main menu report number 9, a rejects detail report as shown in FIG. 20 may be directly accessed.

The reports accessible by using the main menu use the same set of data base files previously described. Such data may, however, be accessed somewhat differently using the main menu. For example, if the preprinted rejects report is accessed via the main menu, as opposed to being printed in order of decreasing number of rejects, the user may access a listing of those accounts having rejects above a predetermined threshold. Additionally, with the main menu, a user can access data relating to a monthly account history that is obtained by accessing the ACCTDATA data base previously described.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. In a data processing system having reader means for reading and sorting items having magnetic ink character recognition (MICR) code disposed thereon and first data processor means for receiving data from said reader means and for performing account management processing tasks, a magnetic ink character recognition (MICR) code rejects analysis and management data processing system comprising:
   means for receiving data from said first data processor means; and
   second data processor means responsive to said received data for maintaining cumulative rejected item data for a plurality of accounts, wherein said second data processor means includes: means for converting received data into a format compatible with said second processor means and means for assembling converted data into a plurality of rejected item categories organized by customer account number.

2. In a data processing system having reader means for reading and sorting items having magnetic ink character recognition (MICR) code disposed thereon and first data processor means for receiving data from said reader means and for performing account management processing tasks, a magnetic ink character recognition (MICR) code rejects analysis and management data processing system comprising:
   means for receiving data from said first data processor means; and
   second data processor means responsive to said received data for maintaining cumulative rejected item data for a plurality of accounts, wherein said second data processor means includes means for assembling data relating to accounts having a high number of rejected items and means for displaying said assembled data.

3. A rejects analysis and management data processing system according to claim 2, wherein said second data processor means includes means for assembling data relating to rejected items in at least one of said accounts having a high number of rejected items; and
   means for displaying said rejected item data in said at least one account.

4. In a data processing system having reader means for reading and sorting items having magnetic ink character recognition (MICR) code disposed thereon and first data processor means for receiving data from said reader means and for performing account management processing tasks, a magnetic ink character recognition (MICR) code rejects analysis and management data processing system comprising:
   means for receiving data from said first data processor means;
   second data processor means responsive to said received data for maintaining cumulative rejected item data for a plurality of accounts; and
   display means for displaying rejected item data,
   and wherein said second data processor means includes means for assembling rejected item data for at least one customer account, said rejected item data including a list of the rejected items associated with said account and means for controlling said display means to display said list.

5. In a data processing system having reader means for reading and sorting items having magnetic ink character recognition (MICR) code disposed thereon and first data processor means for receiving data from said reader means and for performing account management processing tasks, a magnetic ink character recognition (MICR) code rejects analysis and management data processing system comprising:
   means for receiving data from said first data processor means;
   second data processor means responsive to said received data for maintaining cumulative rejected item data for a plurality of accounts, wherein said second data processor means includes means for identifying at least one account having a high number of rejected items; and
   means associated with said second data processor means for analyzing at least one of the rejected items from said account to determine the quality of its MICR code.

6. In a data processing system having reader means for reading and sorting items having magnetic ink character recognition (MICR) code disposed thereon and first data processor means for receiving data from said reader means and for performing account management processing tasks, a magnetic ink character recognition (MICR) code rejects analysis and management data processing system comprising:
   means for receiving data from said first data processor means; and
   second data processor means responsive to said received data for maintaining cumulative rejected item data for a plurality of accounts, wherein said means for maintaining cumulative rejected item data includes means for summing the number of rejected items for a predetermined time period.

7. In a data processing system having reader means for reading and sorting items having magnetic ink character recognition (MICR) code disposed thereon and first data processor means for receiving data from said reader means and for performing account management processing tasks, a magnetic ink character recognition (MICR) code rejects analysis and management data processing system comprising:
   means for receiving data from said first data processor means; and
   second data processor means responsive to said received data for maintaining cumulative rejected item data for a plurality of accounts, wherein said means for maintaining cumulative rejected item data includes data base means for storing rejected item data for at least one customer account; and means for updating said rejected item data in said at least one account over a predetermined period of time, wherein said means for updating includes means for shifting data from one field in said data base means to another field.

8. In a data processing system having reader means for reading and sorting items having magnetic ink character recognition (MICR) code disposed thereon and first data processor means for receiving data from said reader means and for performing account management processing tasks, a magnetic ink character recognition (MICR) code rejects analysis and management data processing system comprising:
   means for receiving data from said first data processor means; and
   second data processor means responsive to said received data for maintaining cumulative rejected item data for a plurality of accounts, wherein said means for maintaining cumulative rejected item data includes data base means for storing rejected item data for at least one customer account; and
   means for updating said rejected item data in said at least one account over a predetermined period of time, wherein said means for updating includes means for deriving an updated value for a field in said data base means as a function of data stored in other fields in said data base.

9. In a data processing system having reader means for reading and sorting items having magnetic ink character recognition (MICR) code disposed thereon and first data processor means for receiving data from said reader means and for performing account management processing tasks, a magnetic ink character recognition (MICR) code rejects analysis and management data processing system comprising:
   means for receiving data from said first data processor means; and
   second data processor means responsive to said received data for maintaining cumulative rejected item data for a plurality of accounts, wherein said means for maintaining cumulative data includes means for maintaining a rejected item history for at least one customer account.

10. In a data processing system having reader means for reading and sorting items having magnetic ink character recognition (MICR) code disposed thereon and means for generating rejected item data, a rejects analysis and management data processing system comprising:
    means for receiving said rejected item data and for storing said rejected item data for a plurality of accounts;
    data processing means, responsive to said means for receiving, for updating said rejected item data for each of said plurality of accounts to maintain a cumulative record of said rejected item data over a predetermined period of time to thereby maintain a rejected item history for at least one customer account; and
    means for analyzing rejected items from at least one of said accounts to determine the quality of its MICR code.

11. A rejects analysis and management data processing system according to claim 10, further including keyboard means for entering operator responses and a display means for displaying rejected item data, said means for updating including means for interactively controlling said display means to display operator selected rejected item data in response to said operator responses.

12. A rejects analysis and management data processing system according to claim 10, wherein said data processing means includes memory means for storing rejected item analysis programs and rejected item data.

13. A rejects analysis and management data processing system according to claim 12, wherein said memory means includes fast access, expanded memory means for storing data and programs that are likely to be frequently utilized.

14. In a data processing system having reader means for reading and sorting items having magnetic ink character recognition (MICR) code disposed thereon and means for generating rejected item data, a rejects analysis and management data processing system comprising:
    means for receiving said rejected item data and for storing said rejected item data for a plurality of accounts;
    data processing means, responsive to said means for receiving, for updating said rejected item data for each of said plurality of accounts to maintain a cumulative record of said rejected item data over a predetermined period of time to thereby maintain a rejected item history for at least one customer account, wherein said data processing means includes means responsive to said received data for assembling data relating to a plurality of accounts having a high number of rejected items; and
    means for displaying said assembled data.

15. A rejects analysis and management data processing system according to claim 14, said processing means includes means for assembling data relating to rejected items in at least one of said accounts having a high number of rejected items; and
    means for displaying said rejected item data in said at least one account.

16. In a data processing system having reader means for reading and sorting items having magnetic ink character recognition (MICR) code disposed thereon and means for generating rejected item data, a rejects analysis and management data processing system comprising:
    means for receiving said rejected item data and for storing said rejected item data for a plurality of accounts; and
    data processing means, responsive to said means for receiving, for updating said rejected item data for each of said plurality of accounts to maintain a cumulative record of said rejected item data over a predetermined period of time to thereby maintain a rejected item history for at least one customer account,
    wherein said means for updating includes data base means for storing rejected item data for at least one customer account, and
    wherein said means for updating includes means for deriving an updated value for a field in said data base means as a function of data stored in other fields in said data base means.

17. In a data processing system having reader means for reading and sorting items having magnetic ink character recognition (MICR) code disposed thereon and means for generating rejected item data, a rejects analysis and management data processing system comprising:
    means for receiving said rejected item data and for storing said rejected item data for a plurality of accounts; and data processing means, responsive to said means for receiving, for updating said rejected item data for each of said plurality of accounts to maintain a cumulative record of said rejected item data over a predetermined period of time to thereby maintain a rejected item history for at least one customer account, wherein said processing means includes means for analyzing said rejected item data to categorize the rejected item as to the source of the reject, and means for storing rejected item indicia in a file dedicated to accumulating data related to said source.

18. In a data processing system having reader means for reading items having magnetic ink character recognition (MICR) code disposed thereon, a method of analyzing items rejected by said reader means comprising the steps of:
receiving data related to items read by said reader means;
storing rejected item data for a plurality of accounts;
updating said rejected item data for said plurality of accounts to maintain a cumulative record of said rejected item data for said accounts; and
defining at least one rejected items history file for said plurality of accounts, and
wherein the step of storing includes the step of storing in at least one history file the daily volume of items processed for a given account and the daily number of items rejected in said account.

19. A method according to claim 18, further including the step of creating a file that identifies each of the rejected items for at least one account.

20. In a data processing system having reader means for reading items having magnetic ink character recognition (MICR) code disposed thereon, a method of analyzing items rejected by said reader means comprising the steps of:
receiving data related to items read by said reader means;
storing rejected item data for a plurality of accounts;
updating said rejected item data for said plurality of accounts to maintain a cumulative record of said rejected item data for said accounts;
defining at least one rejected items history file for said plurality of accounts;
deriving the total volume of items processed and the total number of items rejected over a predetermined period of time; and
storing said derived totals in said at least one history file for a plurality of accounts.

21. In a data processing system having reader means for reading items having magnetic ink character recognition (MICR)) code disposed thereon, a method of analyzing items rejected by said reader means comprising the steps of:
receiving data related to items read by said reader means;
storing rejected item data for a plurality of accounts;
updating said rejected item data for said plurality of accounts to maintain a cumulative record of said rejected item data for said accounts; and
defining at least one rejected items history file for said plurality of accounts, and
wherein said updating step includes the step of shifting data in said at least one history file.

22. In a data processing system having reader means for reading items having magnetic ink character recognition (MICR) code disposed thereon, a method of analyzing items rejected by said reader means comprising the steps of:
receiving data related to items read by said reader means;
storing rejected item data for a plurality of accounts;
updating said rejected item data for said plurality of accounts to maintain a cumulative record of said rejected item data for said accounts; and
creating a file that identifies the printer of the items for at least one account.

23. In a data processing system having reader means for reading items having magnetic ink character recognition (MICR) code disposed thereon, a method of analyzing items rejected by said reader means comprising the steps of:
receiving data related to items read by said reader means;
storing rejected item data for a plurality of accounts;
updating said rejected item data for said plurality of accounts to maintain a cumulative record of said rejected item data for said accounts; and
creating a file that identifies an account and the bank officer in charge of said account.

24. In a data processing system having reader means for reading items having magnetic ink character recognition (MICR) code disposed thereon, a method of analyzing items rejected by said reader means comprising the steps of:
receiving data related to items read by said reader means;
storing rejected item data for a plurality of accounts;
updating said rejected item data for said plurality of accounts to maintain a cumulative record of said rejected item data for said accounts;
analyzing the rejected item data to categorize the rejected item as to the source of the reject; and
storing rejected item indicia in a file dedicated to accumulating data related to said source.

25. A method according to claim 24 further including the step of creating a file to keep track of those items which can not be accurately categorized.

26. In a data processing system having reader means for reading items having magnetic ink character recognition (MICR) code disposed thereon, a method of analyzing items rejected by said reader means comprising the steps of:
receiving data related to items read by said reader means;
storing rejected item data for a plurality of accounts;
updating said rejected item data for said plurality of accounts to maintain a cumulative record of said rejected item data for said accounts; and
interactively displaying said rejected item data, wherein said step of interactively displaying includes the step of: displaying a summary report indicating the total number of items rejected and total number of items processed.

27. A method according to claim 26, wherein said summary report generally identifies the source of the items rejected.

28. In a data processing system having reader means for reading items having magnetic ink character recognition (MICR) code disposed thereon, a method of analyzing items rejected by said reader means comprising the steps of:
receiving data related to items read by said reader means;
storing rejected item data for a plurality of accounts;

updating said rejected item data for said plurality of accounts to maintain a cumulative record of said rejected item data for said accounts; and interactively displaying said rejected item data, wherein said step of interactively displaying includes the step of display a menu permitting a user to select from a plurality of sources of rejected items for detailed analysis.

29. A method according to claim 28, wherein said sources of rejected items include at least one of preprinted items, proofing stations in an organization, branches of an organization, and item processing stations having reader/sorters.

30. A method according to claim 28, further including the step of displaying detailed data relating to a selected source of rejected items.

31. A method according to claim 30, including the step of displaying an indication that said selected source of rejected items si incurring a rejected item error rate above a predetermined threshold.

32. A method according to claim 30, wherein said detailed data relates to preprinted MICR code items.

33. A method according to claim 32, further including the step of displaying a sorted list of preprinted items identifying accounts having a relatively high number of rejected items.

34. A method according to claim 32, further including the step of displaying detailed account data regarding a selected account having a high number of preprinted rejected items.

35. A method according to claim 34, further including the step of assembling data from a plurality of data files relating to said account and displaying an account profile for said selected account.

36. A method according to claim 34, further including the step of displaying a detailed listing of the individual items rejected in said account.

37. A method according to claim 36, wherein said detailed listing identifies a MICR character code which could not be read.

38. A method according to claim 37, further including the step of analyzing the MICR quality of rejected items in said account.

39. A method according to claim 34, further including the step of automatically generating a letter for informing the source of rejected item errors as to the nature of the errors.

40. A method according to claim 39, wherein said step of automatically generating includes the step of interactively permitting a user to select a letter from a plurality of form letter files.

41. In a data processing system having reader means for reading items having magnetic ink character recognition (MICR) code disposed thereon, a method of analyzing items rejected by said reader means comprising the steps of:

receiving data related to items read by said reader means;

storing rejected item data for a plurality of accounts;

updating said rejected item data for said plurality of accounts to maintain a cumulative record of said rejected item data for said accounts;

interactively displaying said rejected item data; and comparing unrepaired MICR rejected item data with repaired MICR code image data and determining which MICR code characters could not be read based on the comparison.

42. In a data processing system for reading and processing items having magnetic ink character recognition (MICR) code disposed thereon, a rejected item analysis and management system comprising:

means for receiving rejected item data from a first source;

reader means for reading data from a plurality of MICR encoded items for generating MICR code analyzation data;

processing means, responsive to said means for receiving rejected item data and said reader means for generating analyzation data, for determining the MICR quality of at least one MICR character that could not be read from a rejected item; and means for storing rejected item data from said first source and said analyzation data.

43. A rejected item analysis and management system according to claim 42, wherein said processing means includes means for comparing data from said first source and said analyzation data and for generating MICR code quality data relating to characters which could not be read by said first source.

44. A rejected item analysis and management system according to claim 42, wherein said reader means for generating analyzation data is fed rejected items from customer accounts having the largest number of rejected items.

45. A rejected item analysis and management system according to claim 42, including display means coupled to said processing means for displaying rejected item data.

46. In a data processing system for reading and processing items having magnetic ink character recognition (MICR) code disposed thereon, a rejected item analysis and management system comprising:

means for receiving rejected item data from a first source;

reader means for reading data from a plurality of MICR encoded items for generating MICR code analyzation data;

processing means, responsive to said means for receiving rejected item data and said reader means for generating analyzation data, for determining the MICR quality of at least one MICR character that could not be read from a rejected item, wherein said processing means includes means for generating a letter to a customer account holder reporting the results of said rejected item analysis.

47. In a data processing system having reader means for reading and sorting items having magnetic ink character recognition (MICR) code disposed thereon and means for generating rejected item data, a rejects analysis and management data processing system comprising:

means for receiving said rejected item data and for storing said rejected item data for a plurality of accounts; and data processing means, responsive to said means for receiving, for updating said rejected item data for each of said plurality of accounts to maintain a cumulative record of said rejected item data over a predetermined period of time to thereby maintain a rejected item history for at least one customer account, wherein said data processing means includes: means for converting received data into a format compatible with said processing means and means for assembling converted data into a plurality of rejected item categories organized by customer account number.

48. In a data processing system having reader means for reading and sorting items having magnetic ink character recognition (MICR) code disposed thereon and means for generating rejected item data, a rejects analysis and management data processing system comprising:
   means for receiving said rejected item data and for storing said rejected item data for a plurality of accounts; and
   data processing means, responsive to said means for receiving, for updating said rejected item data for each of said plurality of accounts to maintain a cumulative record of said rejected item data over a predetermined period of time to thereby maintain a rejected item history for at least one customer account,
   wherein said means for updating includes data base means for storing rejected item data for at least one customer account, and
   wherein said processing means for updating includes means for shifting data from one field in said data base means to another field.

* * * * *